US010350564B2

(12) United States Patent
Niimi et al.

(10) Patent No.: US 10,350,564 B2
(45) Date of Patent: Jul. 16, 2019

(54) APPARATUS AND METHOD FOR CALCINATION OF GYPSUM

(71) Applicant: YOSHINO GYPSUM CO., LTD., Tokyo (JP)

(72) Inventors: Katsumi Niimi, Tokyo (JP); Kazumi Endo, Tokyo (JP); Takeshi Takenaka, Tokyo (JP); Kouji Nitoh, Tokyo (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 0 days.

(21) Appl. No.: 15/553,073

(22) PCT Filed: Feb. 12, 2016

(86) PCT No.: PCT/JP2016/054065
§ 371 (c)(1),
(2) Date: Aug. 23, 2017

(87) PCT Pub. No.: WO2016/136485
PCT Pub. Date: Sep. 1, 2016

(65) Prior Publication Data
US 2018/0036697 A1 Feb. 8, 2018

(30) Foreign Application Priority Data

Feb. 25, 2015 (JP) .................................. 2015-035904
Feb. 25, 2015 (JP) .................................. 2015-035905

(51) Int. Cl.
*C04B 11/02* (2006.01)
*F27B 15/00* (2006.01)
(Continued)

(52) U.S. Cl.
CPC .................. *B01J 6/001* (2013.01); *B01J 6/00* (2013.01); *B09B 3/00* (2013.01); *C01F 11/46* (2013.01);
(Continued)

(58) Field of Classification Search
CPC .......... C04B 11/028; C04B 20/04; B01J 6/00; B01J 6/001; B09B 3/00; C01F 11/46; F26B 3/08; F27B 15/00; F27D 7/04
See application file for complete search history.

(56) References Cited

U.S. PATENT DOCUMENTS 4,052,149 A * 10/1977 Stiling .................... C04B 11/02
34/594
4,227,873 A * 10/1980 Manshausen ........... F27B 9/185
432/131
(Continued)

FOREIGN PATENT DOCUMENTS

EP 0 230 793 A2 12/1986
JP 2571374 1/1997
(Continued)

OTHER PUBLICATIONS

International Search Report dated Apr. 16, 2016 in corresponding International Application No. PCT/JP2016/054065.
(Continued)

*Primary Examiner* — Gregory A Wilson
(74) *Attorney, Agent, or Firm* — Staas & Halsey LLP

(57) ABSTRACT

An apparatus for calcination of gypsum includes a gypsum calciner having an interior wall surface with a circular or annular configuration as seen in its plan view, and a tubular combustor positioned at a center part of a body of the calciner. Raw gypsum is calcined or dehydrated by a high temperature gas spouting flow (Hg) ejected from a lower portion of the combustor. The calciner has a stationary-vane-type or movable-vane-type auxiliary device, which circumferentially energizes the raw gypsum in the vicinity of the interior wall surface toward a circumferential direction of the calciner. The auxiliary device has a plurality of stationary vanes circumferentially arranged in an outer peripheral zone of a lower portion of the combustor and spaced apart (Continued)

from each other at an angular interval, or an agitator extending through a conical or inner circumferential surface defined by the interior wall surface.

19 Claims, 16 Drawing Sheets

(51) Int. Cl.
- *B01J 6/00* (2006.01)
- *B09B 3/00* (2006.01)
- *C01F 11/46* (2006.01)
- *C04B 11/028* (2006.01)
- *F26B 3/08* (2006.01)
- *F27D 7/04* (2006.01)

(52) U.S. Cl.
CPC ........ *C04B 11/028* (2013.01); *C04B 11/0283* (2013.01); *F26B 3/08* (2013.01); *F27B 15/00* (2013.01); *F27D 7/04* (2013.01)

(56) References Cited

U.S. PATENT DOCUMENTS

| | | | |
|---|---|---|---|
| 4,915,623 A | | 4/1990 | Ball et al. |
| 5,011,668 A | * | 4/1991 | Ball .................... C04B 11/0281 423/171 |
| 5,013,237 A | | 5/1991 | Bergounhon |
| 5,580,002 A | * | 12/1996 | Ward ...................... B02C 15/00 241/117 |
| 7,815,889 B2 | * | 10/2010 | Luan ................... C04B 11/0283 423/636 |
| 2009/0151187 A1 | * | 6/2009 | Falinower ........... C04B 11/0281 34/173 |
| 2010/0037618 A1 | | 2/2010 | Charron et al. |

FOREIGN PATENT DOCUMENTS

| | | |
|---|---|---|
| JP | 2005-15263 | 1/2005 |
| JP | 2006-199576 | 8/2006 |
| WO | 2008/039446 A2 | 4/2008 |
| WO | 2012/063127 A2 | 5/2012 |

OTHER PUBLICATIONS

Extended European Search Report dated Sep. 24, 2018 from European Patent Application No. 16755232.2, 12 pages.

* cited by examiner

[FIG. 1]
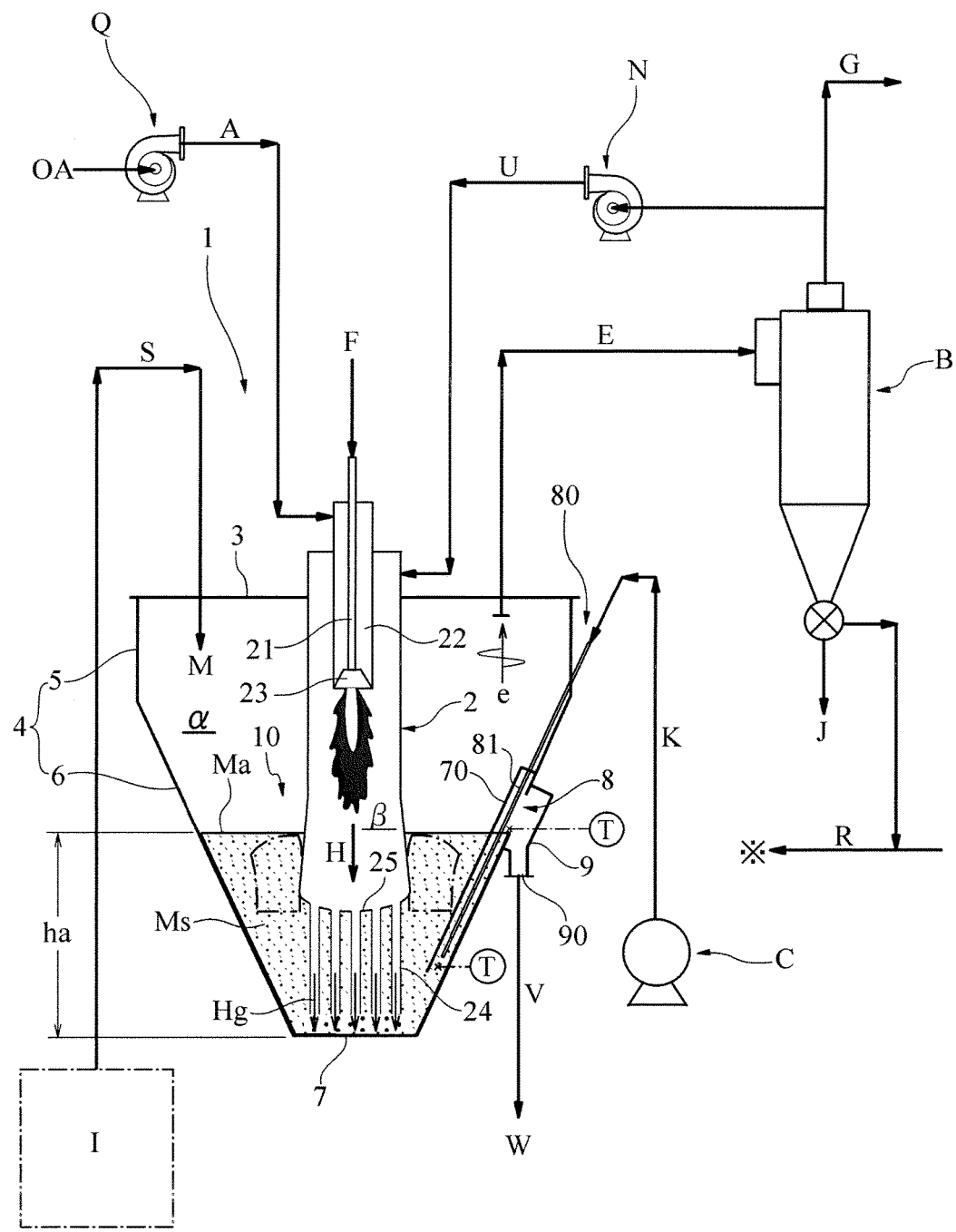

[FIG. 2]
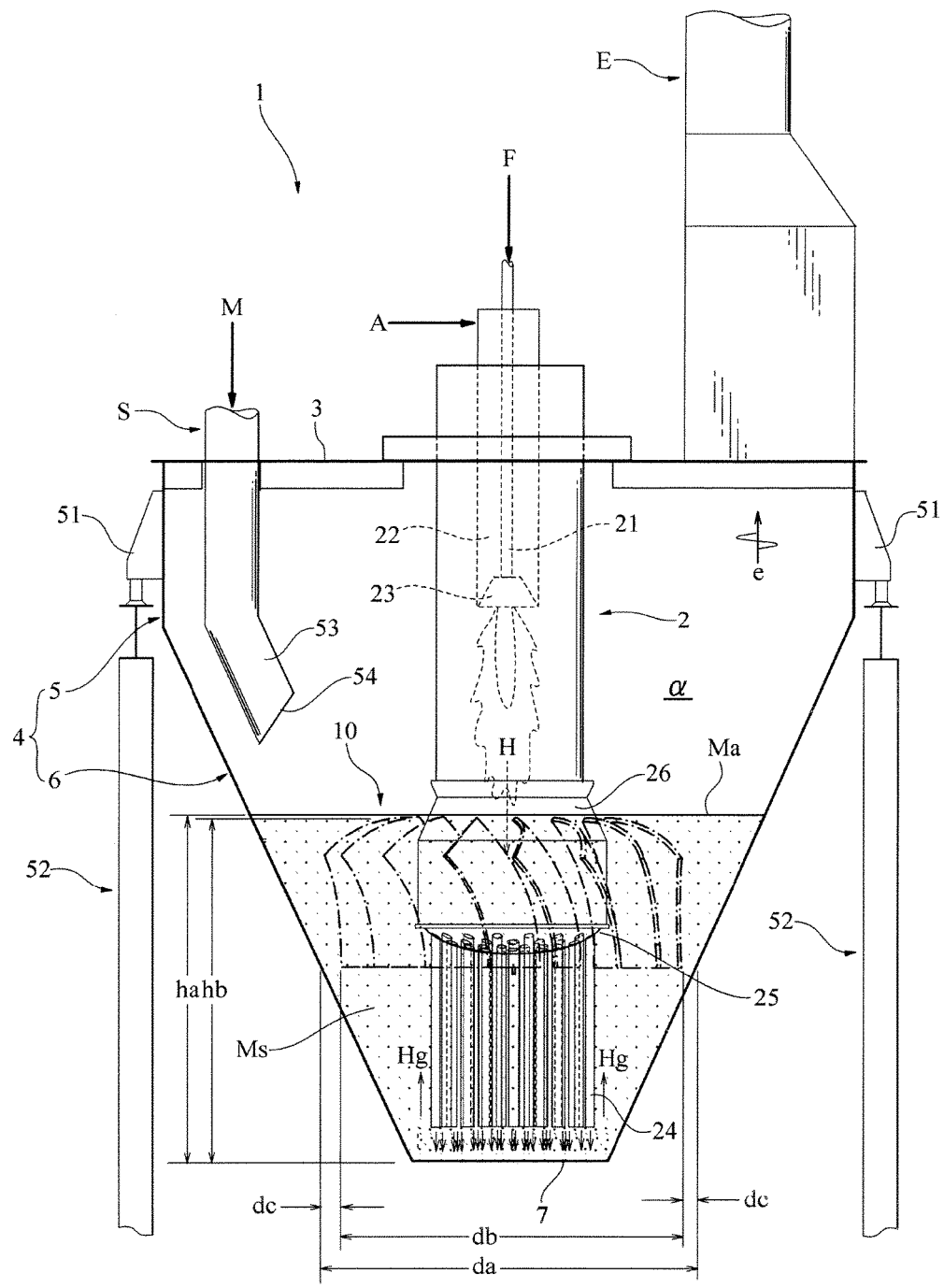

[FIG. 3]
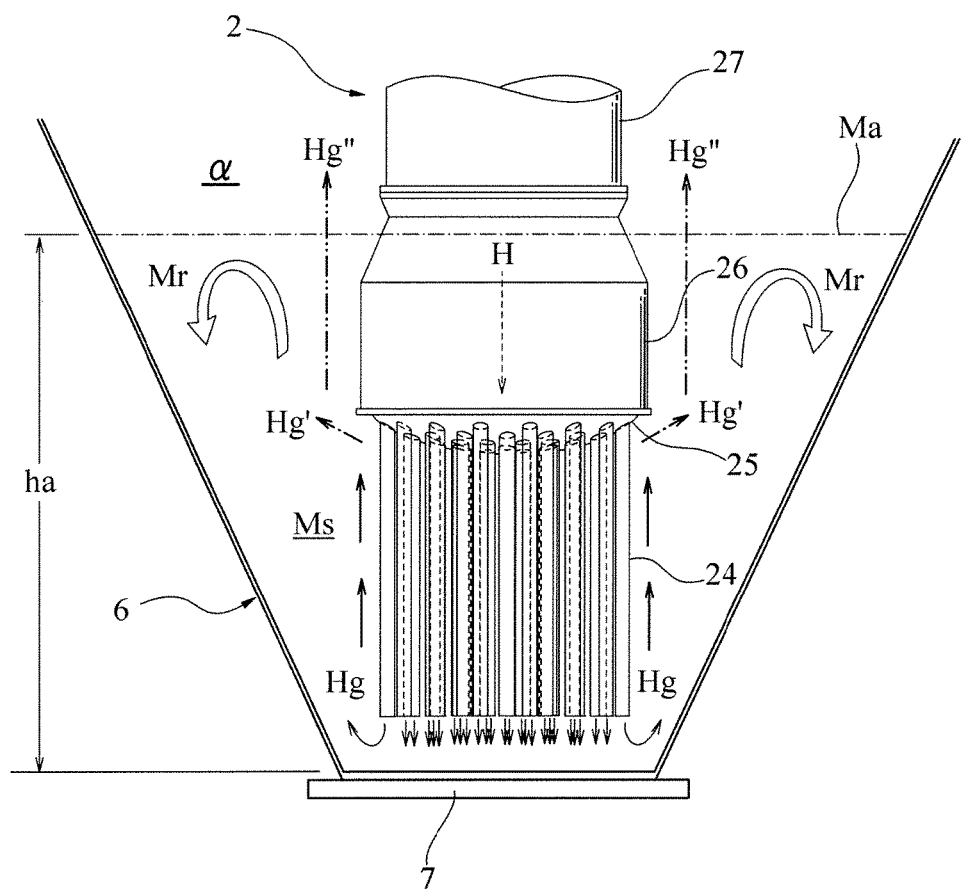

[FIG. 4]
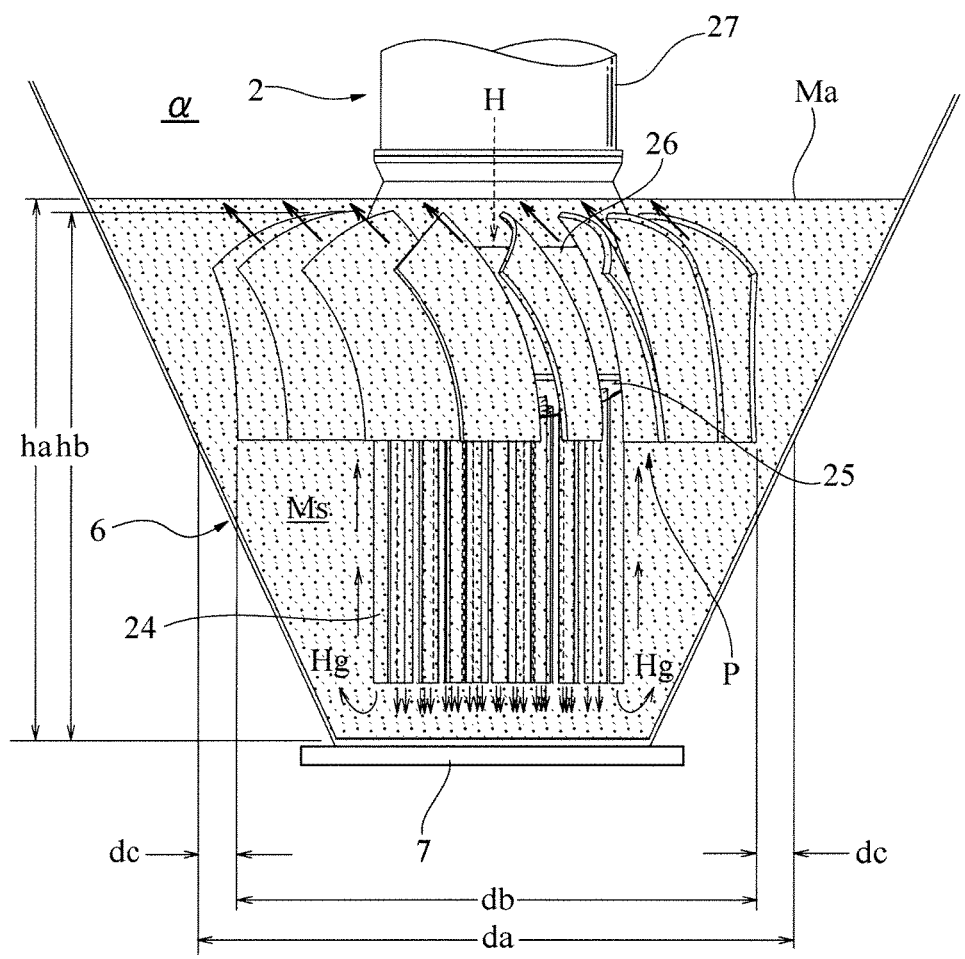

[FIG. 5]
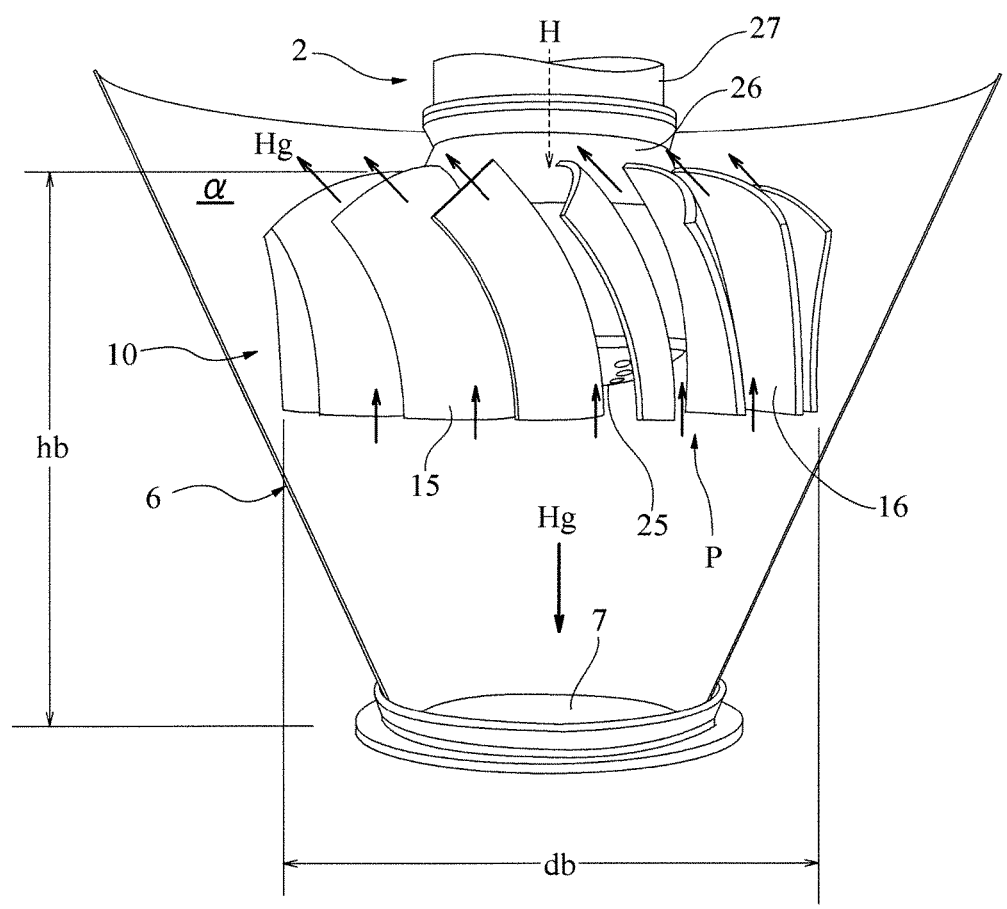

[FIG. 6]
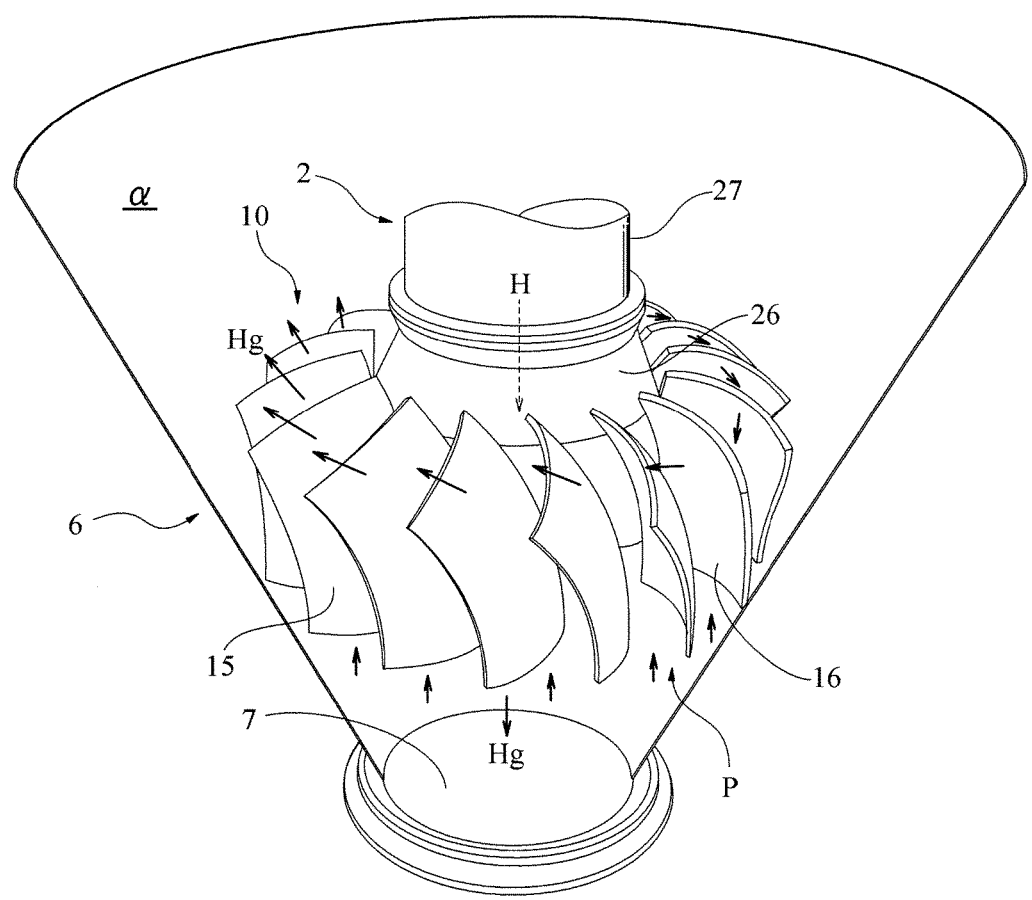

[FIG. 7]
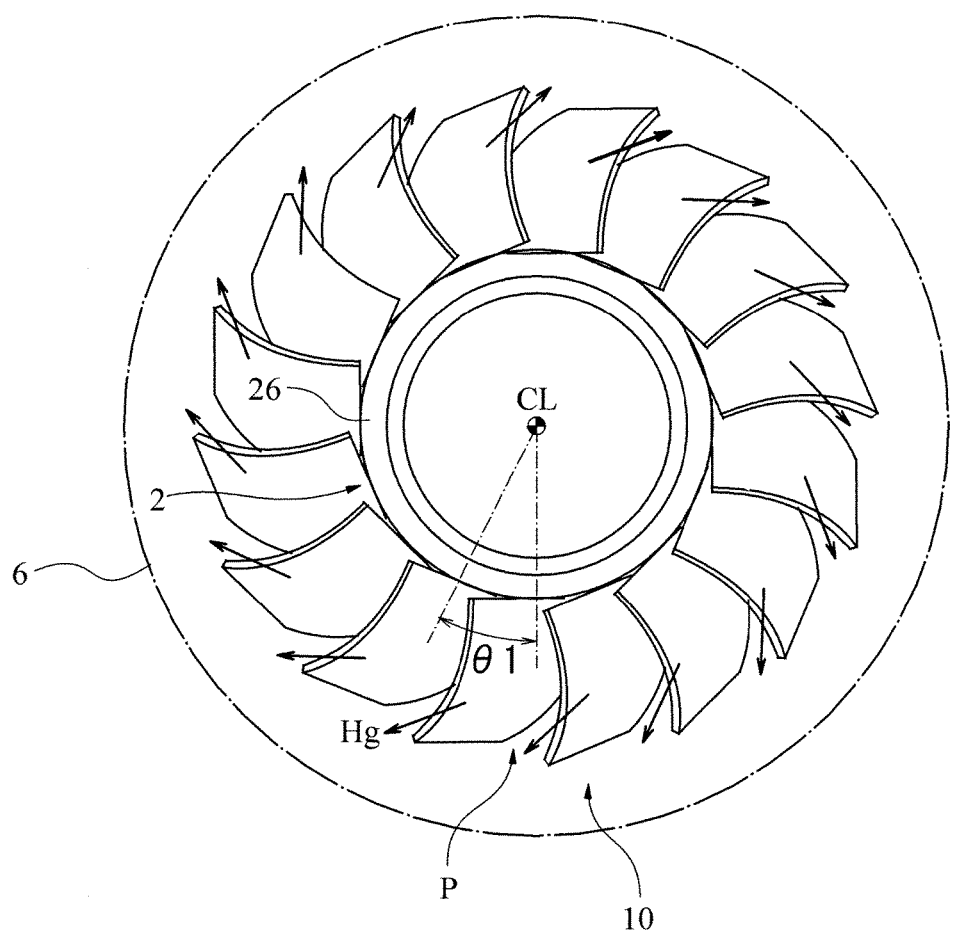

[FIG. 8]
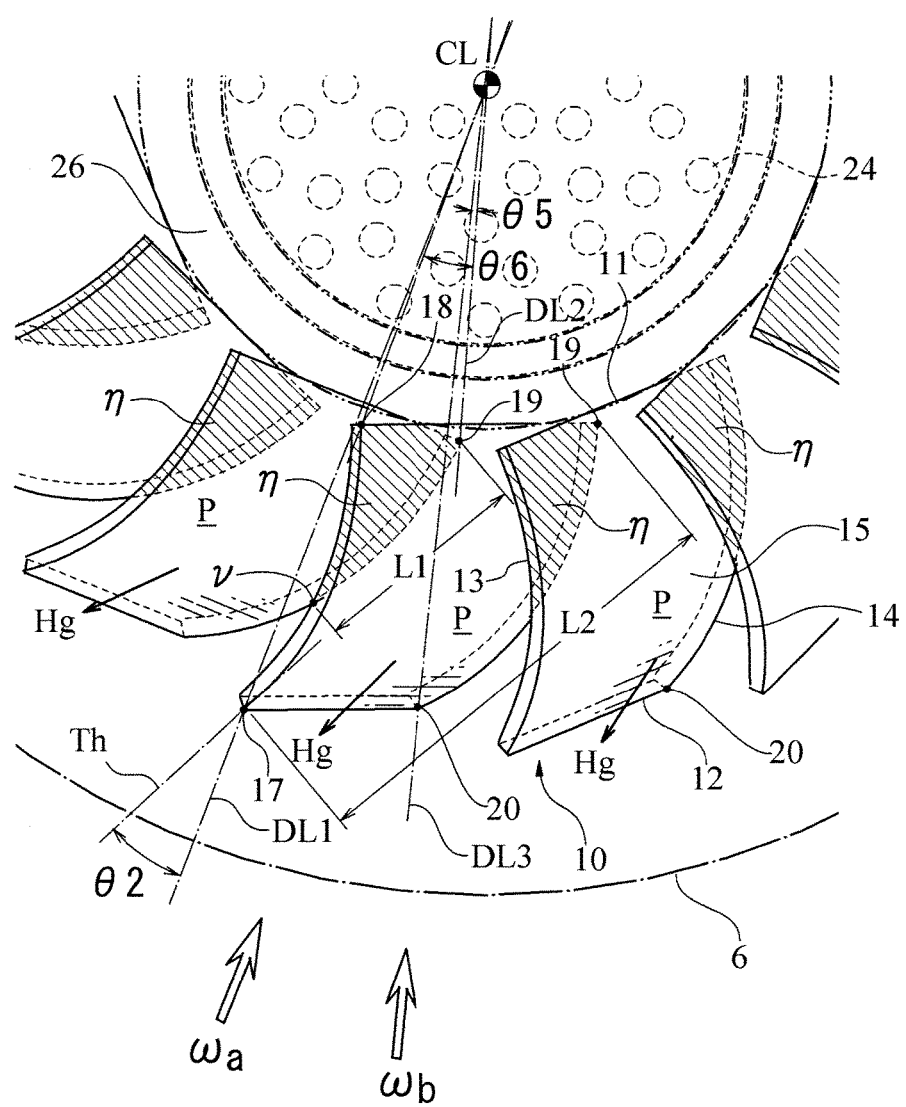

[FIG. 9]
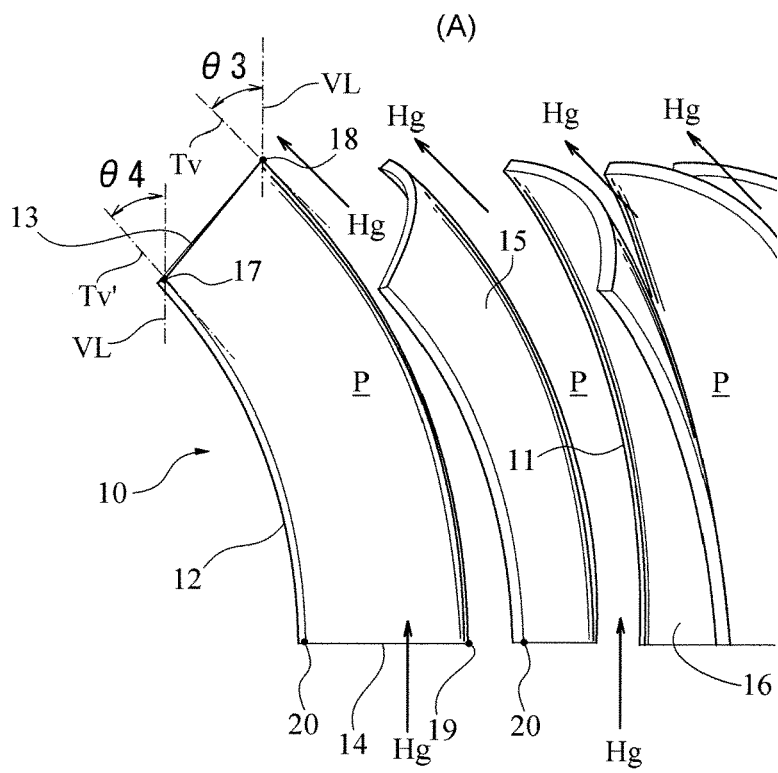
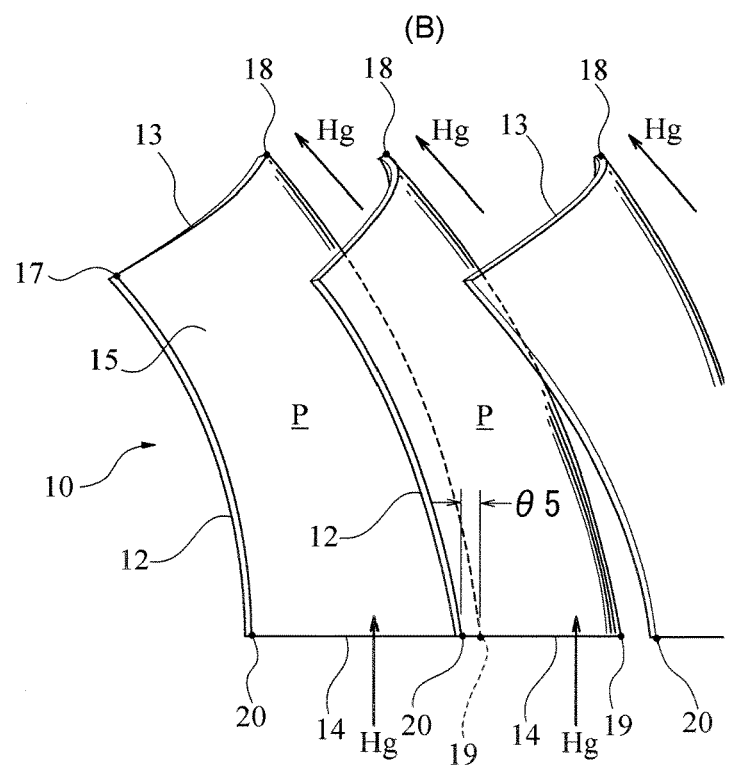

[FIG. 10]
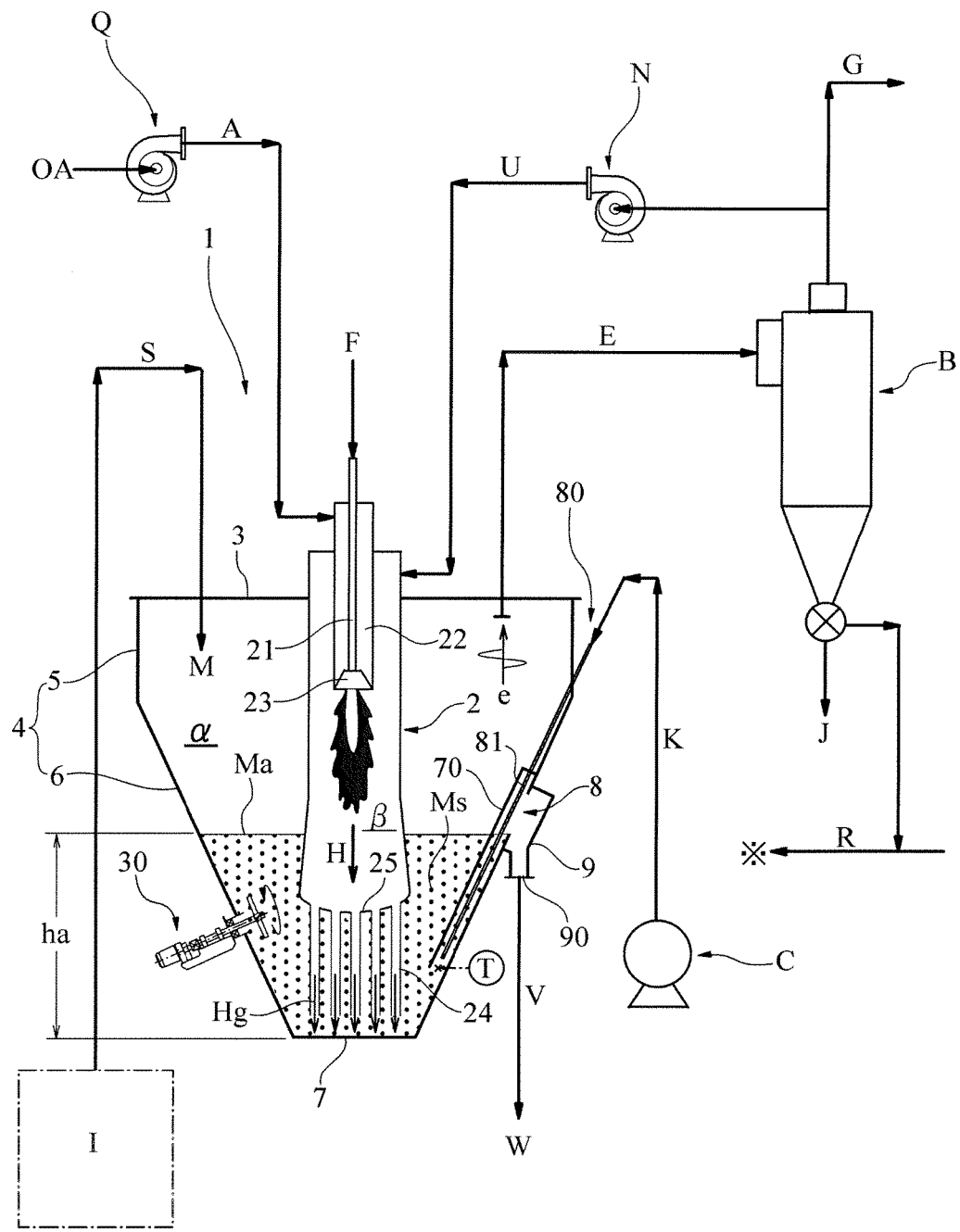

[FIG. 11]
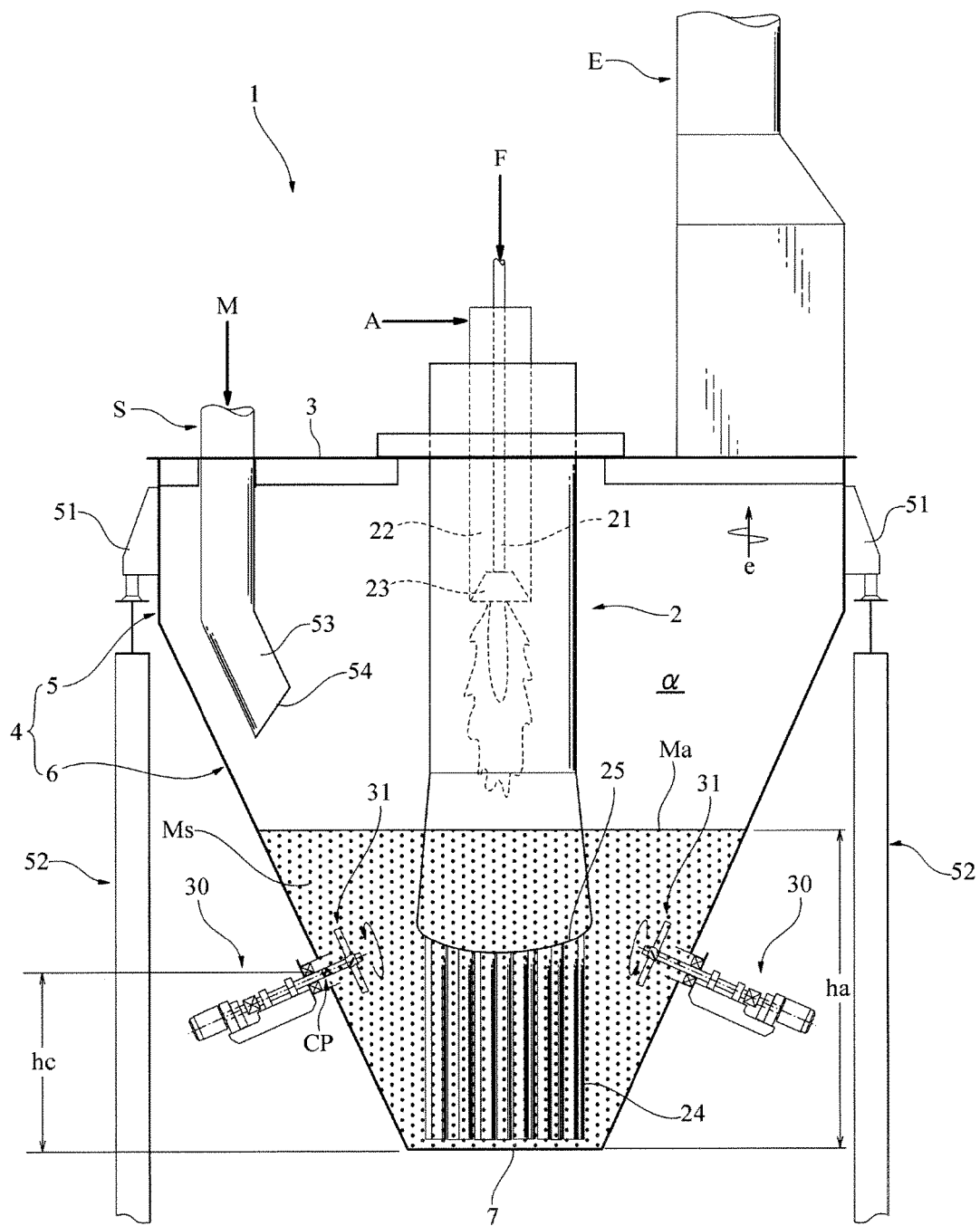

[FIG. 12]
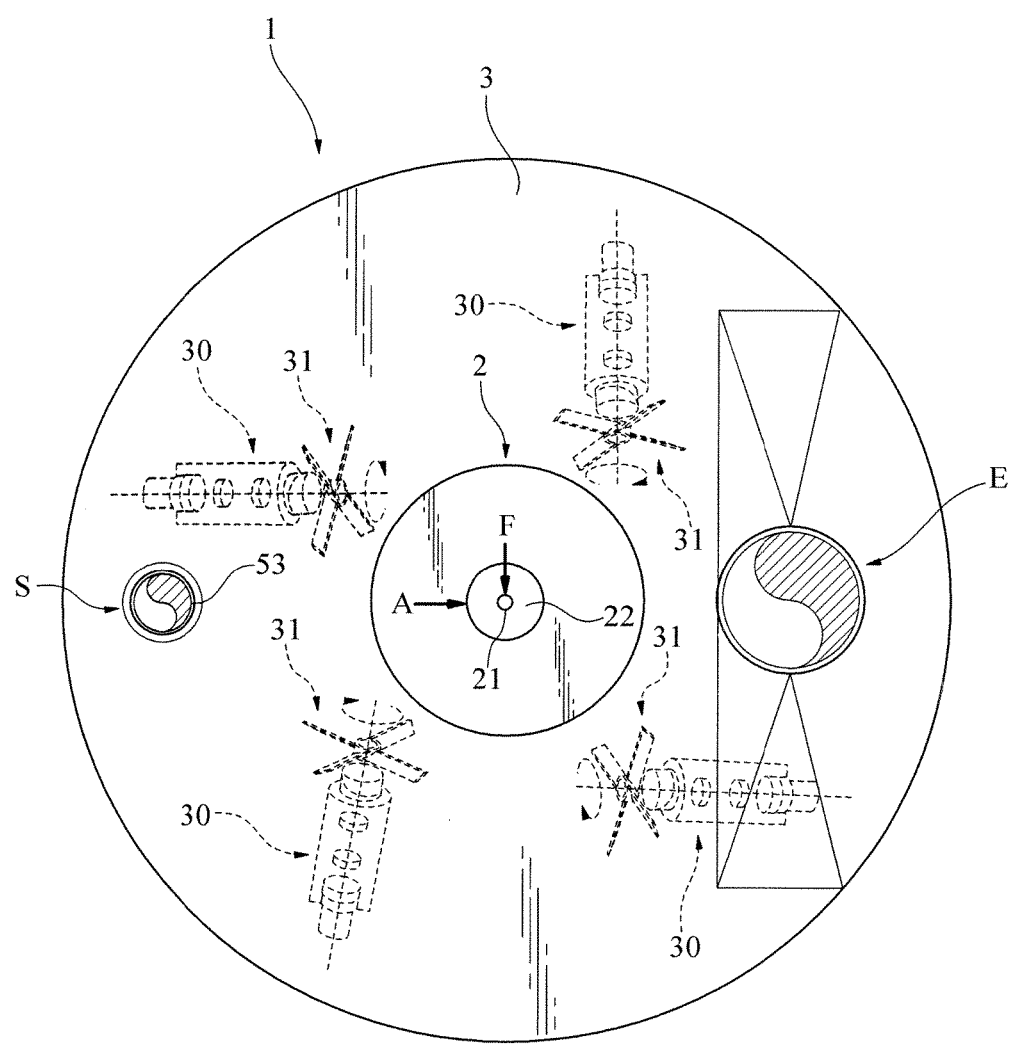

【FIG. 13】
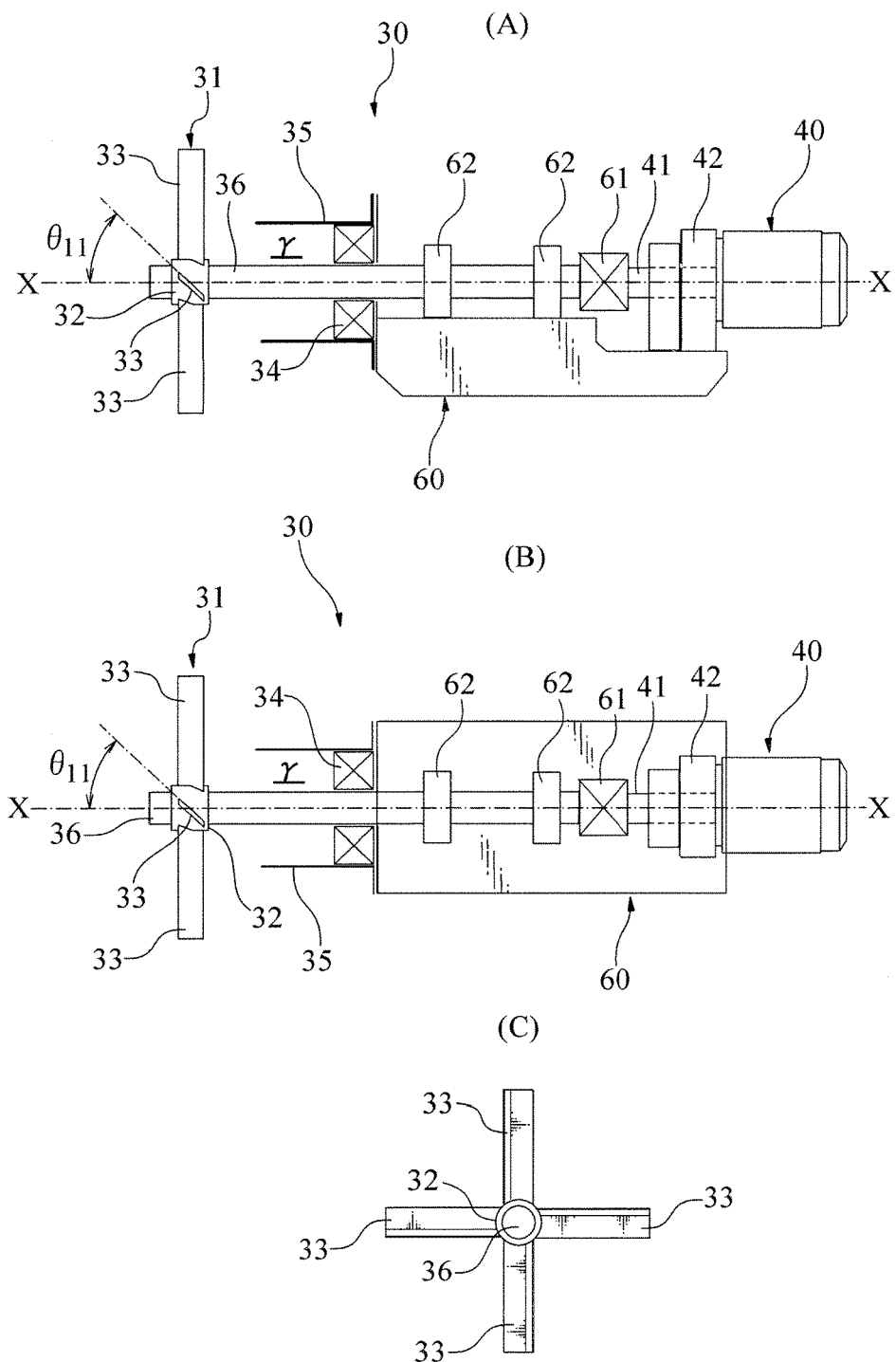

[FIG. 14]
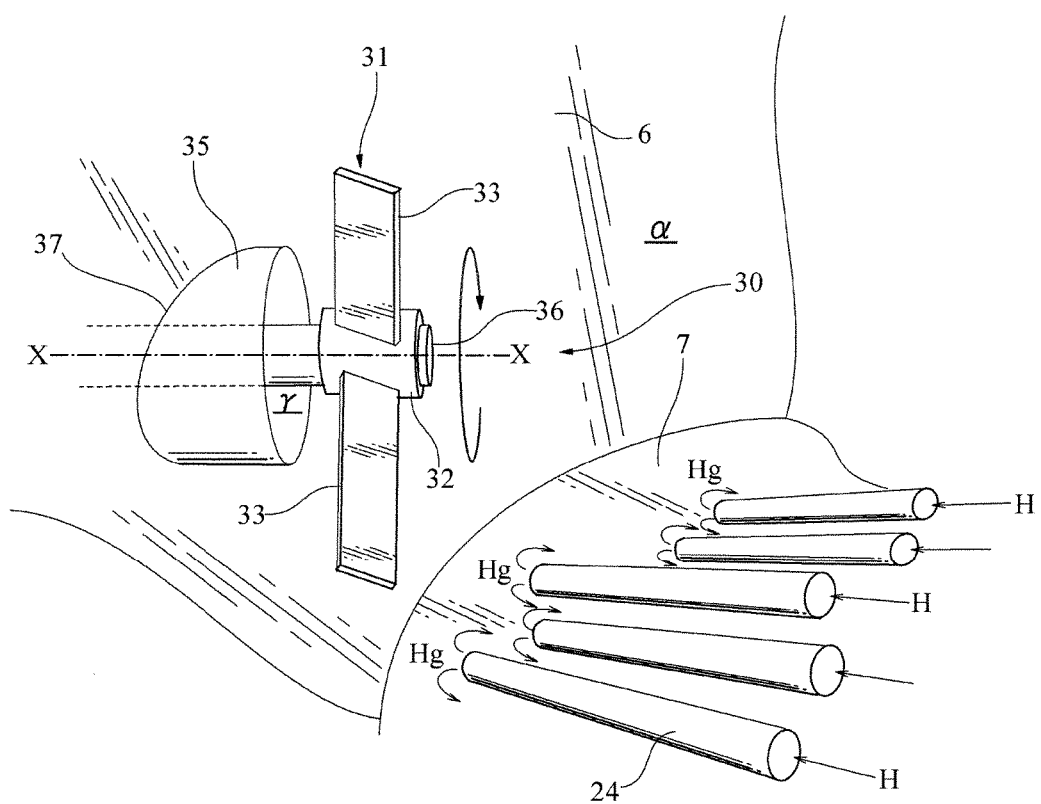

[FIG. 15]
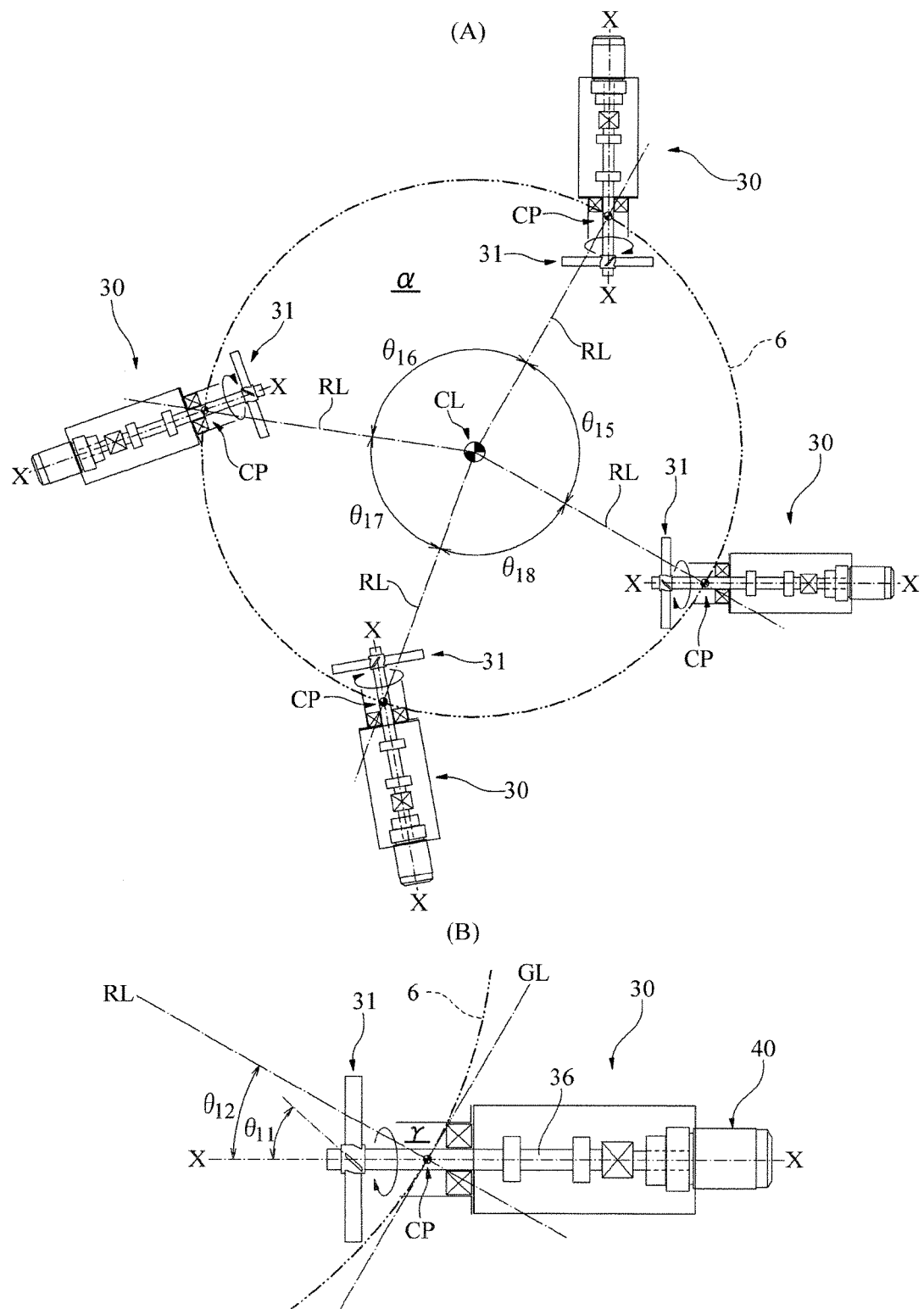

[FIG. 16]
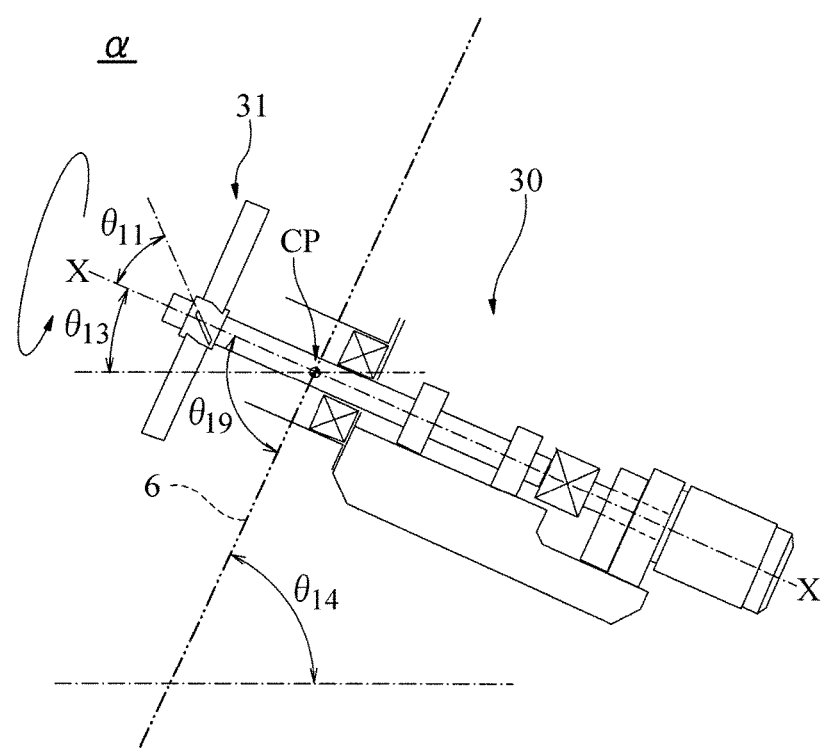

APPARATUS AND METHOD FOR CALCINATION OF GYPSUM

CROSS-REFERENCE TO RELATED APPLICATIONS

This application is a U.S. National Stage Application, which claims the benefit under 35 U.S.C. § 371 of International Application No. PCT/JP2016/054065, filed Feb. 12, 2016, which claims the foreign priority benefit under 35 U.S.C. 119 of Japanese Patent Application Nos. 2015-035904 and 2015-035905, both filed on Feb. 25, 2015, the content of which are incorporated herein by reference.

TECHNICAL FIELD

The present invention relates to an apparatus and method for calcination of gypsum, and more specifically, such an apparatus and method for calcining or dehydrating raw gypsum in a calciner, wherein a high temperature gas spouting flow is ejected toward a bottom part of the calciner by a tubular combustor, which is positioned, in general, at a center part of the calciner and which extends vertically downward from a top part of the calciner.

BACKGROUND ART

Gypsum based boards produced from gypsum, such as gypsum boards, plaster plates and so forth, are commercially and widely available as architectural interior finish materials and so forth. The gypsum may be generally classified into gypsum dihydrate, gypsum hemihydrate and anhydrous gypsum, in accordance with existing state of combined water. In general, the gypsum hemihydrate obtained by calcination of the gypsum dihydrate is used as a raw material for production of gypsum based boards. An oven-type furnace (direct-heating-type furnace), an indirect-heating-type furnace and so forth are used as gypsum calciners for producing the gypsum hemihydrate and so forth, as described in Patent Literatures 1 and 2 (European Patent Laid-Open Publication No. 0230793 and Japanese Patent Publication No. 2571374). In general, in a case of the calciner for producing the gypsum hemihydrate from the gypsum dihydrate, an internal temperature of the calciner is set to be a value approximately in a temperature range from 100 degrees C. to 250 degrees C. Further, the calciner for calcining the gypsum hemihydrate to the anhydrous gypsum is known in the art as described in Patent Literature 3 (Japanese Patent Laid-Open Publication No. 2005-15263). In general, in a case of calcination for calcining the gypsum hemihydrate to the anhydrous gypsum, the internal temperature of the calciner is set to be a value approximately in a temperature range from 300 degrees C. to 950 degrees C.

In regard to such kinds of calciners, a conical-kettle-type calciner and a cylindrical calciner are known in the art. The conical-kettle-type calciner has an inverted conical or cone shaped bottom part, whereas the cylindrical calciner has an substantially uniform circular cross-section over its whole height. In recent years, the conical-kettle-type calciner having a bottom part with a reduced diameter tends to be employed for production of the gypsum hemihydrate and so forth. In both type calciners, the calciner is provided with a tubular combustor or an internal tube depending from a top part of the calciner to a center area inside of the calciner, and a raw gypsum supply means, an exhaust gas tube and so forth are connected to the top wall of the calciner.

Such a tubular combustor of the calciner is connected with a fuel supply tube and a combustion air supply duct. A combustion gas or hot gas at a high temperature (referred to as "high temperature gas" hereinafter) is produced by a combustion reaction of a fuel and combustion air, and the high temperature gas is ejected from a lower part of the tubular combustor to a bottom part of the calciner. The solid matters including gypsum dihydrate and so forth, which are accumulated in the calciner, are fluidized by the high temperature gas spouting flow ejected at a high velocity toward the bottom part, and lose the combined water by heat transfer contact with the high temperature gas, whereby the raw material is calcined to gypsum hemihydrate (or anhydrous gypsum). The calcined gypsum thus obtained is extracted from the calciner through an outlet port for calcined gypsum, which is positioned at a certain position of an interior wall surface of the calciner.

CITATION LIST

Patent Literatures

[Patent Literature 1] European Patent Laid-Open Publication No. 0230793
[Patent Literature 2] Japanese Patent Publication No. 2571374
[Patent Literature 3] Japanese Patent Laid-Open Publication No. 2005-15263

SUMMARY OF INVENTION

Technical Problem

With respect to the gypsum calciners, in general, it is desirable that "uneven calcination" is prevented from occurring in the calcined gypsum in order to equalize the amount of the combined water contained in the calcined gypsum extracted from the calciner, and that the energy efficiency is improved by reducing the hydrocarbonaceous fuel consumption required for operation of the calciner. From such an aspect, the present inventors have prepared a skeleton model of the gypsum calciner for analysis of a fluidization phenomenon occurring in the calciner, and have performed various experiments in regard to fluidity of a deposit of the raw gypsum accumulated in the calciner. As the results, the present inventors have recognized the phenomenon as described hereinafter, wherein the aforesaid "uneven calcination" means a phenomenon in which the calcined gypsum contains a relatively large amount of excessively calcined gypsum and/or insufficiently calcined gypsum.

(1) A lot of the high temperature gas spouting flow, which is ejected toward the bottom part of the calciner, tends to flow upward along an outer peripheral surface of the tubular combustor, thereby erupting from a center area of a top surface of the deposit of the raw gypsum.

(2) In the calciner, in which the high temperature gas spouting flow is ejected toward the center area of its bottom part, the raw gypsum in vicinity of the outer peripheral surface of the combustor can be desirably fluidized. However, the gas flow is difficult to act on the gypsum in an inner peripheral zone of the calciner which is in vicinity of the interior wall surface thereof and which is spaced apart from the combustor, and therefore, the raw gypsum in the inner peripheral zone is difficult to be fluidized sufficiently.

(3) As the calcined gypsum is extracted from the calciner through a certain part of the inner peripheral zone of the calciner, the raw gypsum in the calciner should generally move in a circumferential direction of the calciner. The raw gypsum in the peripheral zone is apt to move downward along the inverse conical wall surface of the calciner. However, the raw gypsum in the peripheral zone is relatively difficult to move in the circumferential direction of the calciner.

As described in Patent Literatures 1 to 3, the conventional type of gypsum calciner is, e.g., a calciner which is arranged to eject the high temperature gas spouting flow through a number of slits or slots formed on the lower part of the tubular combustor, or a calciner which is arranged to diffuse the high temperature gas spouting flow radially outward by a conical protrusion, the protrusion being provided on a bottom surface of the calciner with the protrusion partially extending into a lower end opening of the tubular combustor. As the other type of gypsum calciner, a multiple-tube-type calciner is known in the art, which has a tubular combustor with a lower part being divided into a number of narrow tubes and which ejects the high temperature gas spouting flow downward from a lower end of each of the narrow tubes. The multiple-tube-type calciner has been employed in relatively many facilities in recent years.

According to recognition of the present inventors, it is considered that the fluidizing phenomenon having the tendency as described in the above items (1) to (3) may occur in each of the gypsum calciners having the respective types of gas ejecting systems, and that such a fluidizing phenomenon is relatively closely related to occurrence of the uneven calcination and the hydrocarbonaceous fuel consumption.

It is an object of the present invention to provide an apparatus and method for calcination of gypsum arranged to eject the high temperature gas spouting flow to the bottom part of the calciner, wherein the fluidity of the deposit of the raw gypsum accumulated in the calciner is so improved that the uneven calcination can be prevented from occurring in the calcined gypsum and that the fuel consumption of the apparatus can be reduced.

Solution to Problem

The present inventors have found out in the experiments that the above object can be achieved by provision of a stationary-vane-type (passive-type) or movable-vane-type (active-type) auxiliary device, which energizes the raw gypsum in vicinity of an interior wall surface of the calciner in a circumferential direction of the calciner, or augments a movement of the raw gypsum in the vicinity thereof in the circumferential direction.

(1) Stationary-Vane-Type (Passive-Type) Apparatus and Method for Calcination of Gypsum In order to achieve the above object, the present invention provides an apparatus for calcination of gypsum, which includes a gypsum calciner having an interior wall surface with a circular or annular horizontal cross-section or profile, and a tubular combustor located at a center part of the calciner and generating a high temperature gas, wherein a spouting flow of the high temperature gas is ejected to an interior area of the calciner through a high temperature gas outlet provided at a lower part of the combustor, so that raw gypsum fed to the interior area continuously or intermittently is calcined or dehydrated by the high temperature gas, and the calcined or dehydrated gypsum is discharged out of the calciner, comprising:

an auxiliary device energizing the raw gypsum in vicinity of the interior wall surface toward a circumferential direction of said calciner, or augmenting a movement of the raw gypsum in the vicinity of the interior wall surface toward the circumferential direction, wherein the auxiliary device has a plurality of stationary vanes circumferentially arranged in an outer peripheral zone of said combustor and spaced at an angular interval from each other, and the vanes adjacent to each other define a fluid path for the raw gypsum and the high temperature gas, so that an upward flow of said high temperature gas, which is spouted to a bottom part of the calciner, is deflected toward a radially outward and circumferential direction of said combustor by the fluid path.

The present invention also provides a method for calcination of gypsum with use of the apparatus for calcination of gypsum having the arrangement as set forth above, wherein the upward flow of the high temperature gas, which is spouted toward the bottom part of the calciner, is guided toward the radially outward and circumferential direction of said combustor by said stationary vanes, so that said raw gypsum is fluidized toward the radially outward and circumferential direction of the combustor with deflection of the upward flow, whereby the raw gypsum in the vicinity of the interior wall surface is energized toward the circumferential direction of the calciner, or the movement of the raw gypsum toward the circumferential direction in the vicinity of the interior wall surface is augmented.

From another aspect, the present invention provides a method for calcination of gypsum, in which a calciner having an interior wall surface with a circular or annular configuration as seen in its plan view, and a tubular combustor located at a center part of the calciner are provided, and raw gypsum in the calciner is calcined or dehydrated by a spouting flow of a high temperature gas ejected from a lower part of the combustor, wherein a plurality of stationary vanes are arranged in an outer peripheral zone of said combustor and spaced at an angular interval from each other, and wherein an upward flow of said high temperature gas spouting to a bottom part of the calciner is guided toward a radially outward and circumferential direction of said combustor by said vanes, and fluidization of said raw gypsum toward the radially outward and circumferential direction of the combustor is caused by said upward flow, whereby the raw gypsum in vicinity of the interior wall surface is energized toward the circumferential direction of the calciner, or a movement of the raw gypsum toward the circumferential direction in the vicinity of the interior wall surface is augmented.

According to the present invention, the upward flow of the high temperature gas spouting to the bottom part of the calciner is deflected to the radially outward and circumferential direction of the tubular combustor by the deflecting or guiding action of the stationary vanes, so as to fluidize toward the inner peripheral zone, whereby the raw gypsum in the vicinity of the interior wall surface of the calciner is energized in the circumferential direction of the calciner, or the movement of the raw gypsum in the vicinity thereof in the circumferential direction of the calciner is augmented. According to the experiments by the present inventors, which have been conducted with use of an actual calciner having the aforementioned arrangement, it has been found that the amount of the combined water contained in the calcined gypsum is generally reduced in comparison with the corresponding amount obtained in a case of the calciner without the above vanes, and that the ratios of gypsum hemihydrate and anhydrous gypsum contained in the calcined gypsum are so stable that the uniformly calcined gypsum with less unevenness of calcination can be generally produced. Further, according to the experiments of the present inventors, a value of set temperature of the calciner can be decreased by 5 degrees C. or more, with relation to such a uniform calcination effect on the raw gypsum, and therefore, the fuel consumption can be reduced remarkably. Thus, in accordance with the present invention, the fluidity of the deposit of the raw gypsum accumulated in the calciner can be improved, the uneven calcination can be prevented from occurring in the calcined gypsum, and the fuel consumption of the calciner can be reduced.

(2) Movable-Vane-Type (Active-Type) Apparatus and Method for Calcination of Gypsum In order to achieve the above object, the present invention provides an apparatus for calcination of gypsum, which includes a gypsum calciner having an interior wall surface with a circular or annular horizontal cross-section or profile, and a tubular combustor located at a center part of the calciner and generating a high temperature gas, wherein a spouting flow of the high temperature gas is ejected to an interior area of the calciner through a high temperature gas outlet provided at a lower part of the combustor, so that raw gypsum fed to the interior area continuously or intermittently is calcined or dehydrated by the high temperature gas, and the calcined or dehydrated gypsum is discharged out of the calciner, comprising:

an auxiliary device energizing the raw gypsum in vicinity of the interior wall surface toward a circumferential direction of said calciner, or augmenting a movement of the raw gypsum in the vicinity of the interior wall toward the circumferential direction, wherein the auxiliary device has an agitator which extends through a conical surface or an inner circumferential surface defined by said interior wall surface;

wherein the agitator is provided with a rotary shaft protruding into the calciner from said conical or inner circumferential surface in a position below an upper surface of the raw gypsum accumulated in the calciner, and an agitating vane rotating in the interior area with rotation of the rotary shaft; and wherein a center axis (X) of the rotation of said shaft is oriented in a direction at an angle ($\theta 12$) in a range from 30 degrees to 80 degrees as seen in its plan view, relative to a normal line (RL) passing through a point of intersection (CP) between said axis (X) and said conical or inner circumferential surface, and said vane rotates about said axis (X) to energize the raw gypsum in the vicinity of the interior wall surface toward a circumferential direction of the interior wall surface.

The present invention also provides a method for calcination of gypsum with use of the calciner with the arrangement as set forth above, wherein the raw gypsum in the vicinity of the interior wall surface is energized toward the circumferential direction of the calciner by rotation of said vane, or a movement of the raw gypsum toward the circumferential direction of the calciner in the vicinity of the interior wall surface is augmented by the rotation of said vane.

From another aspect, the present invention provides a method for calcination of gypsum, in which a calciner having an interior wall surface with a circular or annular configuration as seen in its plan view and a tubular combustor positioned at a center part of the calciner are provided, and raw gypsum in the calciner is calcined or dehydrated by a high temperature gas spouting flow ejected from a lower part of the combustor, wherein the raw gypsum accumulated in the calciner is agitated by an agitating vane, so that the raw gypsum in an inner peripheral zone of the calciner in vicinity of the interior wall surface is energized toward a circumferential direction of the calciner to be moved in the circumferential direction.

Preferably, a value of set temperature for calcination, which is to be set in a condition that the agitator is in operation, is decreased, in comparison with the value of set temperature for calcination to be set in a condition that the agitator is not in operation, by at least 5 degrees C.

According to the present invention, the raw gypsum in the vicinity of the interior wall surface of the calciner is energized in a circumferential direction of the calciner by rotation of the vane, or the movement of the raw gypsum therein is augmented in the circumferential direction by the rotation of the vane. According to the experiments by the present inventors, which have been conducted with use of an actual calciner having the aforementioned arrangement, it has been found that, when the agitator is operated, the amount of the combined water contained in the calcined gypsum is generally reduced, in comparison with the corresponding amount obtained when the agitator is not operated, and that the ratios of gypsum hemihydrate and anhydrous gypsum contained in the calcined gypsum are so stable that the uniformly calcined gypsum with less unevenness of calcination can be generally produced. Further, according to the experiments of the present inventors, a value of set temperature in the calciner can be decreased by 5 degrees or more, with relation to such a uniform calcination effect on the raw gypsum, and therefore, the fuel consumption can be reduced remarkably. Thus, in accordance with the present invention, the fluidity of the deposit of the raw gypsum accumulated in the calciner can be improved, the uneven calcination can be prevented from occurring in the calcined gypsum, and the fuel consumption of the calciner can be reduced.

Advantageous Effects of Invention

According to the present invention, an apparatus and method for calcination of gypsum arranged to eject the high temperature gas spouting flow to the bottom part of the calciner can be provided, wherein the fluidity of the deposit of the raw gypsum accumulated in the calciner can be so improved that the uneven calcination can be prevented from occurring in the calcined gypsum and that the fuel consumption of the apparatus can be reduced.

BRIEF DESCRIPTION OF THE DRAWINGS

FIG. 1 is a system flow diagram illustrating a system constitution of a stationary-vane-type (passive-type) apparatus for calcination of gypsum.

FIG. 2 is a vertical cross-sectional view schematically showing a structure of a calciner as shown in FIG. 1.

FIG. 3 is a vertical cross-sectional view partially showing the calciner, wherein depictions of stationary vanes and a deposit are omitted therefrom.

FIG. 4 is a cross-sectional view similar to FIG. 3, wherein the stationary vanes and the deposit are depicted.

FIG. 5 is a fragmentary perspective view of the calciner, in which a position, configuration and structure of each of the stationary vanes are illustrated.

FIG. 6 is a fragmentary perspective view of the calciner, in which the position, configuration and structure of each of the stationary vanes are illustrated.

FIG. 7 is a horizontal cross-sectional view of the calciner, in which the position, configuration and structure of each of the stationary vanes are schematically illustrated.

FIG. 8 is a partially enlarged plan view showing the structure of each of the stationary vanes.

FIGS. 9 (A) and 9 (B) are partially enlarged elevational views, each showing the structure of the vane, wherein a view as seen in an arrow ωa of FIG. 8 is illustrated in FIG. 9 (A) and a view as seen in an arrow ωb of FIG. 8 is illustrated in FIG. 9 (B).

FIG. 10 is a system flow diagram illustrating a system constitution of a movable vane-type (active-type) apparatus for calcination of gypsum.

FIG. 11 is a vertical cross-sectional view schematically illustrating the structure of the calciner as shown in FIG. 10.

FIG. 12 is a plan view of the calciner as shown in FIG. 11.

FIGS. 13 (A) and 13 (B) are a side elevational view and a plan view schematically showing the structure of the agitator, and FIG. 13 (C) is a front elevational view of the agitating vanes.

FIG. 14 is a view of an interior area as seen obliquely from its upper side, wherein the area surrounding the vanes is illustrated in a condition that the raw gypsum has not been dumped into the calciner.

FIGS. 15 (A) and 15 (B) are plan views, each showing a positional relation between the agitator and a conical wall.

FIG. 16 is a vertical cross-sectional view showing the positional relation between the agitator and the conical wall

DESCRIPTION OF EMBODIMENTS

According to a preferred embodiment of the present invention, the calciner with the stationary-vane-type auxiliary device has the fluid path defined by the stationary vanes adjacent to each other, wherein the fluid path opens toward the inner peripheral zone of the calciner and extends upward in a direction generally inclined relative to a vertical direction. Preferably, with respect to angular positions of outer and inner ends of a lower part of the vane around a center axis of the tubular combustor, the outer end of the vane backward in a direction of deflection of the high temperature gas spouting flow is located at an angular position forward in the direction of deflection, relative to the inner end of the vane forward in the direction of deflection, whereby a movement of the flow directed in the radially outward direction is restricted from occurring, so as not to impede the movement of the raw gypsum in the circumferential direction. More preferably, a proximal end portion of the vane attached to the combustor is located to be superimposed over the proximal end portion of the adjacent vane, as seen in their plan views, so that the vanes adjacent to each other form an overlapping area (η) of the vanes in the outer peripheral zone of the lower end portion of the combustor. The overlapping area (η) prevents or impedes the upward flow of the high temperature gas from blowing vertically upward in a zone close to an outer peripheral surface of the combustor.

In a preferred embodiment of the present invention, the angular interval of the stationary vanes is set to be an angle in a range from 10 degrees to 60 degrees, more preferably, in a range from 15 degrees to 30 degrees, and an uppermost part of each of the stationary vanes is positioned below an upper surface (a design level) of the deposit of the raw gypsum accumulated in the interior area of the calciner. If the number of the stationary vanes is excessively small, a relatively large load or stress is imposed on each of the vanes. This results in an apprehension that damage, breakage or the like may occur at the proximal end portion of the vane. On the other hand, if the number of the stationary vanes is excessively large, the distance between the adjacent vanes is reduced. This results in an apprehension that adhesion of gypsum onto the stationary vanes may occur. Therefore, the number of the stationary vanes should be set to be a suitable number in consideration of the load or stress on the vanes, adhesion of gypsum onto the vanes, and so forth.

Preferably, the designed level (ha) of the upper surface of the deposit is set to be a level in a range from 1.0×hb to 1.2×hb, wherein "hb" is a designed level of the uppermost part of the stationary vane, and wherein the designed levels "ha", "hb" are dimensions vertically measured from a bottom surface of the calciner. The upper surface of the deposit behaves irregularly during operation of the calciner. The designed level of the upper surface of the deposit is a preset level or average level designed or theoretically determined, based on the assumption of stable or normal operation of the calciner. That is, the stationary vane may be preferably positioned below the upper surface of the deposit (the designed level), and therefore, the stationary vane may be preferably located, on design, in a position in which the vane is substantially completely embedded in the deposit of the raw gypsum accumulated in the interior area of the calciner.

More preferably, the stationary vane is a curved plate defining the curved fluid path, which deflects the raw gypsum upwardly moving together with the upward flow, toward the radially outward and circumferential direction. Preferably, an upper edge portion of the vane is curved as seen in its plan view, and is generally inclined downward, extending toward a direction radially outward of the combustor, whereas a lower edge portion of the vane is curved as seen in its plan view, and extends substantially horizontally. The diameter defined by outermost ends of the lower portions of the stationary vanes (the diameter (db) of a circle with its center being at a center axis of the body of the calciner or the tubular combustor) is smaller than a diameter of the interior wall surface at the same level, so that the stationary vane and the interior wall surface are spaced at a predetermined horizontal distance (dc) from each other. At the level of the lower edges of the stationary vanes, the diameter (db) of the vanes is set to be, preferably, in a range from 0.8×"da" to 1.0×"da", more preferably, in a range from 0.9×"da" to 1.0×"da", wherein "da" is an inner diameter of the interior wall surface in the calciner.

Preferably, as regards the calciner with the stationary vane, a value of set temperature for calcination is decreased by at least 5 degrees C., in comparison with the value of set temperature for calcination to be set for the calciner without the stationary vane.

In a preferred embodiment of the calciner with the movable-vane-type auxiliary device, the angle (θ12) of the center axis (X) of rotation of the agitator is set to be a value in a range from 45 degrees to 75 degrees. Preferably, an inclined angle (θ13) of the center axis (X) of the rotation relative to a horizontal plane passing through the aforesaid point of intersection (CP) is set to be an angle in a range from −15 degrees to 40 degrees. In a case where the rotary shaft is arranged to protrude obliquely upward in the interior area of the calciner, the raw gypsum in the peripheral zone is additionally energized obliquely upward by rotation of the agitating vane.

Preferably, the agitating vane is of paddle-type agitating vanes including a plurality of vanes which extend radially outward from a rotation center area containing the rotary shaft, wherein the plane of each of the vanes is inclined at an angle (θ11) relative to the center axis (X). More preferably, the agitator has a sheath pipe which surrounds the shaft in concentricity with the shaft, and a supporting section for the shaft, which is located inside of the sheath pipe. The sheath pipe is fixed to the body of the calciner, and the rotary shaft is rotatably journaled by the supporting section. The shaft extends into the interior of the calciner from an open end of the sheath pipe on the interior side, and carries the vane in the interior area.

In a more preferred embodiment of the present invention, the height hc of the point of intersection (CP) is set to be in a range from 0.3×ha to 0.7×ha, wherein "ha" is a height of the upper surface of the deposit of the accumulated raw gypsum measured from the bottom surface of the calciner. Preferably, the at least three agitators are positioned to be circumferentially spaced apart at an angular interval from each other.

Embodiment-1

With reference to the attached drawings, preferred embodiments of the present invention are described hereinafter.

FIG. 1 is a system flow diagram illustrating an apparatus for calcination of gypsum provided with a stationary-vane-type (passive-type) gypsum calciner. With reference to FIGS. 1 to 9, a first embodiment of the present invention (the stationary-vane-type) is described hereinafter.

A gypsum calcination system is provided with a conical-kettle-type gypsum calciner 1 (referred to as "calciner 1" hereinafter) for calcining gypsum dihydrate; a raw gypsum supply device I (generally shown by phantom lines) for supplying the calciner 1 with the gypsum dihydrate as raw gypsum M; a raw gypsum supply line S for dumping or charging the raw gypsum M of the device I into an internal area α of the calciner 1; an exhaust gas pipe E for discharging combustion exhaust gas e of the area α through a top part of the calciner; a cyclone-type dust separator B connected with the pipe E; and a compressor C connected with the calciner 1 by a compressed air supply tube K. The separator B is connected with a dust collector (not shown), such as a bag filter, through an exhaust line G. The dust collector is connected with an exhaust fan (not shown) for discharging the combustion exhaust gas e out of the system by, for example, emission of the gas to the atmosphere. A quantity of powder or dust separated or captured by the separator B or the dust collector is discharged out of the system through a discharging line J, or recycled through a powder recycle line R to the calciner 1. As regards conveying devices and charging/discharging devices for the raw gypsum and calcined gypsum, or various equipments of the exhaust system for the exhaust gas, depictions of their concrete constitutions or the like are omitted from FIG. 1.

The calciner 1 is provided with a reactor-vessel-type or reaction-furnace-type body integrally assembled, which is also called as a dehydrator or a calcination kettle. The raw gypsum M is continuously or intermittently fed to an internal area of the calciner through the line S, and the calcined gypsum W is continuously or intermittently delivered out of the calciner through a delivery line V. The calciner 1 comprises a tubular combustor 2 positioned at a center part of the body and directed vertically downward; a horizontal top wall 3 through which the combustor 2 extends vertically; an annular wall 4 having a cylindrical wall 5 and a conical wall 6 integrally jointed; and a horizontal bottom wall 7 having a diameter smaller than a diameter of the top wall 3. Each of the walls 5, 6 has a horizontal cross-section or profile in a form of a perfect circle or an annular configuration. The combustor 2 is provided with a fuel supply passage 21 and a combustion air supply passage 22 located along a center axis (a vertical axis) of the combustor 2 respectively, and a mixing device 23 for mixing the fuel with the combustion air. A fuel supply pipe F is connected with the passage 21 and a combustion air supply duct A is connected with the passage 22. The passage 21 is connected through the pipe F with a fuel supply source (not shown), such as a city gas supply source. The passage 22 is connected with an air supply device Q through the duct A. The device Q is a centrifugal fan, a blower, or the like, which delivers outdoor air OA, such as atmospheric air, to the passage 22 under pressure. Further, a recirculation air feeding line U provided with a fan N for recirculation of the exhaust gas is connected with the combustor 2, and a part of the combustion exhaust gas through the line G is introduced into the combustor 2. Depictions of concrete constitutions of the fuel feeding system and so forth are omitted from FIG. 1. Further, depictions of a secondary air supply system for optionally supplying secondary combustion air to the combustor 2, and so forth, are omitted from FIG. 1.

The fuel and air through the passages 21, 22 collisionally mix with each other in the mixing device 23 so that a combustion reaction occurs therein, whereby a quantity of combustion gas at a high temperature generates in an intratubular area β of the combustor 2. The combustor 2 is a multiple-tube-type combustor which has an outlet portion of the area β divided into a number of fluid passages, each having a narrow cross-section. A number of narrow tubes 24, each having a small diameter, are connected to a bottom plate 25 of the combustor 2, so that a number of narrow fluid passages, each having a reduced diameter, are formed by the tubes 24. The combustion gas in the area β flows into each of the tubes 24 as a hot gas H at a high temperature (referred to as "high temperature gas H" hereinafter), which ejects from each of lower end openings of the tubes 24 toward the bottom wall 7.

In the interior area α of the calciner, the raw gypsum M fed through the line S thereto is accumulated as a deposit Ms. A lower portion of the combustor 2 is positioned below a level of an upper surface Ma of the deposit Ms to a certain extent that about a quarter of the combustor 2 in the area α is embedded in the deposit Ms of the raw gypsum M. The high temperature gas H is cooled by thermal radiation to the area α through tube walls of the combustor 2 and the tubes 24, and the gas H spouts downward from the lower end openings of the tubes 24, as high temperature gas spouting flows Hg still having a temperature of about 200-300 degrees C. The raw gypsum M is fluidized by the flows Hg ejected at a bottom part of the calciner, and combined water contained in the raw gypsum M is removed therefrom by heat-transfer between the raw gypsum M and the gas Hg, whereby the raw gypsum M is calcined mainly to be gypsum hemihydrate.

An outlet port 8 for extracting calcined gypsum opens on the conical wall 6, approximately at a level ha of the upper surface Ma (a level measured from a bottom surface of the calciner). The port 8 is provided with a control valve (not shown). An extraction path 70 for extracting the calcined gypsum from the bottom part of the calciner to the port 8 is provided along an inclined surface of the conical wall 6, and a compressed air injection tube 81 of an air-lance device 80 extends obliquely downward through a fluid passage portion of an extraction path 70. The device 80 is connected with the compressor C through the compressed air supply tube K. The device 80 has a number of air injection ports (not shown) provided on a tube wall of the tube 81, and the compressed air is injected through the air injection ports, so that a fluid motion of the calcined gypsum directed from the bottom part of the calciner to the outside of the calciner is urged under an injection pressure of the compressed air. An overflow device 9 is provided outside of the port 8. The device 9 has an overflow gate 90. The calcined gypsum W is delivered out of the calciner through the port 8 and the device 9, and then, fed to a device for the succeeding process (e.g., a homogenizer, a crusher or the like) or a silo by the delivery line V.

A temperature detecting part of a temperature sensor T is provided at a lower end portion of the extraction path 70. The sensor T detects the temperature of the calcined gypsum (the temperature of the product) to be extracted from the calciner. In this embodiment, the gypsum calcination system includes a control system (not shown), which detects the calcination temperature with use of the sensor T and which controls operations of the various devices or equipments of the gypsum calcination system.

In the calciner 1 with such an arrangement, it is preferable to urge the fluidization of the raw gypsum M and energize the gypsum M (or the calcined gypsum W) toward a circumferential direction, thereby smoothly extracting the calcined gypsum W through the port 8 to the outside of the calciner. Therefore, the calciner 1 comprises a plurality of or a number of stationary vanes as a device for promotion of fluidization or energization in the circumferential direction, which are provided on a lower end portion of the combustor 2 and spaced apart at an angular interval from each other. The vanes 10 constitute a stationary-vane-type (passive-type) auxiliary device.

FIG. 2 is a vertical cross-sectional view generally showing the structure of the calciner 1. FIG. 3 is a vertical cross-sectional view partially showing the calciner 1, wherein depictions of the vanes 10 and the deposit Ms are omitted therefrom for illustration of the structure of the lower portion of the combustor 2. FIG. 4 is a vertical cross-sectional view similar to FIG. 3, but the vanes 10 and the deposit Ms are depicted therein. FIGS. 5 to 7 are fragmentary perspective views and a horizontal cross-sectional view of the calciner 1, which show the position, configuration and structure of each of the vanes 10. In FIGS. 5 to 7, depictions of the tubes 24 and the deposit Ms are omitted therefrom for clearly showing the structure of the vanes 10. FIGS. 8 and 9 are a partially enlarged plan view and elevational views showing the structure of each of the vanes 10.

In FIG. 2, the structure of the calciner 1 as shown in FIG. 1 is schematically illustrated. As shown in FIG. 2, a support frame 52 (partially shown in FIG. 2) supports the body of the calciner 1 by means of its jaw parts or leg parts 51 protruding from an outer surface of the cylindrical wall 5. A tubular passage 53 constituting the line S extends through the top wall 3 and depends therefrom in the area α. The upper surface Ma of the deposit Ms (the level ha) is located below a lower end opening 54 of the passage 53.

As shown in FIG. 3, the combustor 2 has an enlarged lower end portion 26 with an enlarged diameter, and the portion 26 is connected to a lower end of a straight tube portion 27. An outer peripheral surface of the portion 26 has a form of a perfect circle in its horizontal cross-section. A number of narrow tubes 24, which constitute the aforementioned multiple-tubes, are connected to a bottom plate 25 of the portion 26. Each of the tubes 24 forms a fluid passage with a reduced cross-section. For instance, each of the tubes 24 has a cross-sectional area of fluid passage equal to or less than one-fiftieth of the cross-sectional area of fluid passage of the combustor 2, for example, approximately equal to one-hundredth of that of the combustor 2. An upper end portion of the tube 24 opens to the intratubular area β and a lower end of the tube 24 opens downward toward the bottom part of the calciner in vicinity of the bottom wall 7. If desired, the mixing device 23 as set forth above may be positioned in the portion 26.

As shown in FIGS. 2 and 4, the vanes 10 are positioned in an outer peripheral zone of the portion 26 under the upper surface Ma. An uppermost portion of the vane 10 (an upper/inner end 18 of the vane 10 as shown in FIG. 9) is positioned at a level hb (a position of the height hb measured from the bottom surface of the calciner). Assuming that the level ha as shown in FIGS. 2 and 4 is a preset level or a designed level of the upper surface Ma, the level ha may be preferably set to be in a range from 1.0×hb to 1.2×hb. That is, the vane 10 may be preferably positioned at a level at which the vane 10 is substantially completely embedded in the deposit Ms. However, during operation of the calciner 1, behavior of the upper surface Ma of the deposit Ms is relatively violent, and a phenomenon including undulations, risings, sinkings and the like occurs on the upper surface Ms. Therefore, an upper part of the vane 10 is frequently exposed to a space above the upper surface Ma. Thus, it should be understood that the positional relation between the levels ha, hb as set forth above is the positional relation in a design condition or an initial setting condition.

As illustrated in FIGS. 2 and 4, a diameter db with respect to a center axis of the combustor 2, which is defined by outer ends of lower portions of the vanes 10, is smaller than an inner diameter da of the conical wall 6 at the same level, and each of the vanes 10 and the wall 6 are spaced apart at a horizontal distance dc from each other. With respect to the diameter da, the diameter db is set to be, preferably, in a range between 0.8×da and 1.0×da, more preferably, in a range between 0.9×da and 1.0×da. Therefore, the horizontal distance dc is set to be, preferably, equal to or less than 0.1×da, more preferably, equal to or less than 0.5×da. In this embodiment, the center axis of the combustor 2 is substantially identical with the center axis of the wall 6.

As shown in FIG. 7, the stationary vanes 10 are arranged circumferentially and spaced from each other at an equal angular interval θ1 about a center axis CL of the combustor 2. The angular interval θ1 is set to be, preferably, an angle in a range from 10 degrees to 60 degrees, more preferably, an angle in a range from 15 degrees to 30 degrees (22.5 degrees in this embodiment). The number of vanes 10 is set to be, preferably, in a range from six to thirty six, more preferably, in a range from twelve to twenty four (sixteen in this embodiment). A proximal end of the vane 10 is integrally attached to an outer peripheral surface of the enlarged lower end portion 26, and the vane 10 extends therefrom, in general, radially outward of the portion 26. The angular interval of the vanes 10 is not inevitably set to be an equal angle throughout the overall circumference, but the angular interval may be set to be an arbitrary angle in correspondence to the structures of the calciner 1 and the combustor 2, and so forth.

As illustrated in FIGS. 8 and 9, each of the stationary vanes 10 is made of a curved metallic plate having a curved inner edge 11, a curved outer edge 12, a curved upper edge 13 and a curved lower edge 14. The proximal end portion of the vane 10 including the edge 11 is fixed to the portion 26 by attachment means, such as brackets and bolts (not shown), or jointing means, such as welding. The vane 10 forms a surface substantially continuous with the outer surface of the portion 26. Each of the edges 11, 12, 13, 14 are curved in a predetermined radius of curvature, and the vane 10 forms a convex curved surface 15 faced obliquely upward and a concave curved surface 16 faced obliquely downward. The upper edge 13 inclines downward, extending outward. The lower edge 14 extends substantially horizontally.

A fluid path P is defined between the adjacent vanes 10. As seen in its plan view, the path P extends in a circumferential and radially outward direction of the combustor 2, while curving. The path P opens toward an inner peripheral zone of the calciner, and extends upward in a form of a curved fluid passage generally inclined relative to the vertical direction. As described later, the path P deflects an upward flow of the high temperature gas spouting flow Hg toward a radially outward and circumferential direction.

In FIG. 8, a line segment DL1 extending in a diametric direction of the combustor 2 (as seen in its plan view) is depicted by a one dot chain line, wherein the segment DL1 passes through the center axis CL and an upper/outer end 17 of the vane 10. As shown in FIG. 8, a tangential line Th (in a horizontal plane) of the vane 10 at the end 17 is oriented in a direction of an angle $\theta2$ relative to the segment DL1. Further, tangential line Tv, Tv' (in a vertical plane) of the vane 10 at an upper/inner end 18 and the upper/outer end 17 are oriented in directions of angles $\theta3$, $\theta4$ relative to the vertical direction VL. The angle $\theta2$ is set to be an angle, preferably, in a range from 20 degrees to 60 degrees, more preferably, in a range from 30 degrees to 50 degrees. The angles $\theta3$, $\theta4$ are set to be an angle, preferably, in a range from 20 degrees to 60 degrees, more preferably, in a range from 30 degrees to 55 degrees.

As shown in FIG. 8, the adjacent vanes 10 are positioned in such a manner that their proximal end portions are overlapped with each other and their distal end portions are spaced apart from each other, as seen in their plan views. The lower/inner end 19 and the lower/outer end 20 of the vane 10 are illustrated in FIG. 8. Further, line segments DL2, DL3 extending in a diametric direction of the combustor 2 (as seen in their plan views) are depicted by one dot chain lines, in FIG. 8. The segment DL2 passes through the center axis CL and the end 19 of the vane 10 positioned forward in a direction of deflection of the gas Hg (a clockwise direction as seen in the plan view). The segment DL3 passes through the center axis CL and the end 20 of the vane 10 positioned backward in the direction of deflection of the gas Hg. Further, an overlapping area $\eta$ of the vanes 10 (as seen in its plan view) is indicated by hatching in FIG. 8.

As shown in FIG. 9 (B), in the direction of deflection, the end 20 of the backward vane 10 is located in an angular position shifted forward, relative to the end 19 of the forward vane 10. The ends 19, 20 are spaced at an angular interval of a central angle $\theta5$ around the center axis CL, as shown in FIG. 8. That is, as seen in the direction of deflection, an angular position of the end 20 of the backward vane 10 has a phase difference of the advanced angle $\theta5$ around the center axis CL, with respect to the angular position of the end 19 of the forward vane 10.

According to the experiments conducted by the present inventors, the high temperature gas spouting flow Hg ejected to the bottom part of the calciner moves upward along a group of the tubes 24, as indicated by upward arrows in FIG. 3. The bottom plate 25 of the enlarged lower end portion 26 acts to direct the upward flow Hg radially outward, as indicated by arrows Hg' in FIG. 3. Therefore, a circumferential movement of the raw gypsum M in vicinity of the interior wall surface of the calciner is apt to be impeded by a movement of the flow Hg (Hg') directed radially outward. Further, according to the experiments of the present inventors, if the vane 10 is not provided, a lot of the flow Hg is apt to erupt from the upper surface Ma in a zone close to the outer peripheral wall of the portion 26, as indicated by arrows Hg" in FIG. 3. This phenomenon is considered to derive from a condition in that the flow Hg relatively easily moves upward along the tubes 24, since the fluid flow resistance is relatively small in the boundary between the metal tube (the tube 24) and the raw gypsum M.

However, the flow Hg directed radially outward by the plate 25 is surely deflected by the vanes 10, since the end 20 of the vane 10 located backward in the direction of deflection has the phase difference of the angle $\theta5$, with respect to the end 19 of the vane 10 forward in the direction of deflection, and the end 20 is in the advanced angular position with respect to the end 19. Therefore, the flow Hg directed radially outward by the plate 25 is ensurely deflected by the vane 10. Thus, the phenomenon, in which the movement of the raw gypsum M in the circumferential direction of the calciner is impeded by the movement of the flow Hg directed radially outward, can be surely prevented from occurring. The angle $\theta5$ is larger than zero degrees, and it is set to be, preferably, equal to or less than $0.3 \times \theta1$, more preferably, equal to or less than $0.2 \times \theta1$, with respect to the angular interval $\theta1$ of the vanes 10. Further, since the overlapping area $\eta$ of the vane 10 is ensured as set forth above, the upward motion of the flow Hg is effectively impeded in the vicinity of the outer peripheral surface of the portion 26, and therefore, the flow Hg can be deflected by the vanes 10. Thus, the phase difference (the angle $\theta5$) and the overlapping area $\eta$ promote a circulation of the flow Hg as described hereinafter and contribute to uniform calcination of the raw gypsum M. The overlapping area $\eta$ may be preferably set to be an area in which an angle $\theta6$ is larger than zero and L1/L2 is equal to or less than ½, wherein the angle $\theta6$ is an angle between the end 18 of the certain vane 10 and the end 19 of its adjacent vane 10, "L1" is a distance between a radially outward end v of the area $\eta$ and the end 19 (as seen in the plan view), and "L2" is a length of the vane 10 measured in its diagonal direction as seen in the plan view (that is, the maximum length of the vane 10 in its plan view).

As shown by the arrows in FIGS. 4 to 9, the vane 10 guides the flow Hg, which moves upward in the path P, toward a radially outward and circumferential direction, so that fluidized matters of the raw gypsum M fluidized by the flow Hg are directed toward the radially outward and circumferential direction, together with the flow Hg. The flow Hg and the raw gypsum M move out from the path P substantially in a tangential direction of the portion 26 from the vicinity of the outer and upper edges 12, 13 and move into the inner peripheral zone of the calciner. The vane 10 is generally curved and the edge 13 is inclined downward while extending outward, and therefore, an upper corner part of the vane 10 does not interfere with such movements of the flow Hg and the raw gypsum M. The flow Hg moving to the peripheral zone is in heat-transferable contact with the raw gypsum M in the vicinity of the interior wall surface of the calciner. Further, the flow Hg and the raw gypsum M directed toward the circumferential direction energize the raw gypsum M in the peripheral zone toward the circumferential direction, or augment a movement of the raw gypsum M in the peripheral zone toward the circumferential direction.

The operation of the calciner 1 with the aforementioned arrangement is explained hereinbelow.

In use of the gypsum calcination system as shown in FIG. 1, the raw gypsum M prepared by the raw gypsum supply device I is fed to the area α, and the gypsum M is accumulated in the lower part of the area α. The combustion air is fed to the combustion air supply passage 22 through the combustion air supply duct A under the delivery pressure of the air supply device Q. The hydrocarbonaceous fuel, such as the city gas, is fed to the fuel supply passage 21 through the fuel supply pipe F. The air and fuel mixed in the mixing device 23 generate the combustion gas at a high temperature in the tubular combustor 2. The combustion gas flows into the narrow tubes 24 as the high temperature gas H, and spouts through the lower end openings of the tubes 24 to the bottom part of the calciner, as the high temperature gas spouting flow Hg.

The flow Hg moves upward along the group of narrow tubes 24 as indicated by the arrows in FIGS. 4 to 9. The flow Hg is deflected toward the radially outward and circumferential direction by the vanes 10, as set forth above. The raw gypsum M of the deposit Ms is fluidized by the flow Hg and heated by the heat-transfer contact with the flow Hg. The flow Hg is cooled by heating the raw gypsum M, and then, erupted from the upper surface Ma to the upper space in the calciner and introduced into the exhaust gas pipe E from the top part of the calciner as the combustion exhaust gas e. The exhaust gas e is emitted out of the system through the dust separator B and the dust collector.

As shown by the arrows Mr in FIG. 3, a lot of the raw gypsum M, which moves upward at the center part of the deposit Ms under pressure of the flow Hg, moves radially outward in the upper layer of the deposit Ms, and then, moves downward along the interior wall surface of the conical wall 6 so as to recirculate to the bottom part of the calciner. The fluidized matters of the flow Hg and the raw gypsum M, which are directed toward the radially outward and circumferential direction, energize the raw gypsum M in the vicinity of the conical wall 6 toward the circumferential direction of the calciner, or augment the movement of the raw gypsum M in the circumferential direction of the calciner. That is, in the deposit Ms, a passively deflecting action of the vane 10 causes a flow or fluidized bed of the raw gypsum M or the calcined gypsum W moving toward the circumferential direction of the calciner in the vicinity of the interior wall surface of the calciner. This flow or fluidized bed may not always be a clearly observable independent flow or fluidized bed. In other words, the vane 10 is intended to generate a circulating flow in the calciner which causes the raw gypsum M or the calcined gypsum W in the vicinity of the interior wall surface to be fluidized toward the circumferential direction at least partially, or intended to form such a circulating flow in the deposit Ms.

The raw gypsum M is heated in such a fluidizing process by its heat-exchange with the high temperature gas, so as to lose the combined water, whereby the raw gypsum M is calcined to the hemihydrate gypsum and so forth. Then, the gypsum is extracted from the calciner through the outlet port 8 by the overflow device 9 and is fed to the system or the like for the succeeding process or the like, as being the calcined gypsum W, by the delivery line V.

According to the experiments conducted by the present inventors, which have been carried out with use of an actual calciner corresponding to the calciner 1, it has been found that, in a case where the gypsum dihydrate is calcined to gypsum hemihydrate by the calciner 1 according to the present embodiment, the ratio of the gypsum dihydrate contained in the calcined gypsum W is reduced, in comparison with the corresponding ratio in a case of calcination by a conventional calciner without the vanes 10, and therefore, that the uniformly calcined gypsum can be produced, which has the little uneven calcination and which has the amount of the combined water generally reduced. Further, since the raw gypsum M can be uniformly calcined, a value of set temperature for calcination can be decreased by approximately 6 or 7 degrees C. For example, with respect to the temperature for calcination which is detected by the temperature sensor T, its target or preset value can be decreased from 150 degrees C. down to 143 or 144 degrees C. For instance, in a case where the city gas is used as the fuel of the calciner 1, the fuel consumption can be reduced by approximately 5% if the set value of the temperature in the calciner is lowered by 6.5 degrees C. Therefore, employment of the vanes 10 with the aforementioned arrangement is significantly effective in reduction of the fuel consumption of the calciner 1.

In the embodiment as set forth above, the design condition of the positional relation between the upper surface of the deposit and the stationary vane is so set that the level ha is in a range from the level hb×1.0 to the level hb×1.2. If desired, however, the positional relation therebetween may be so set that the level ha is lower than the level hb.

Further, the stationary vane and the tubular combustor may be so arranged that the proximal end of the vane is assembled to the combustor through a position adjustment means for adjusting the position of vane relative to the combustor, for variable setting of the position of the vane. Furthermore, in the aforementioned embodiment, the vane has a surface substantially continuous with the outer surface of the combustor, but a gap or clearance with a certain size may be formed between the proximal end portion of the vane and the outer surface of the combustor, if desired.

Embodiment-2

FIG. 10 is a system flow diagram illustrating an apparatus for calcination of gypsum provided with a movable vane-type (active-type) gypsum calciner. With reference to FIGS. 10 to 16, a second embodiment of the present invention (the movable-vane-type) is described hereinafter. In each of FIGS. 10 to 16, the constituent or member substantially the same as the constituent or member in the aforementioned embodiment (FIGS. 1 to 9) or equivalent thereto is indicated by the same reference numeral.

The apparatus as shown in FIG. 10 has the same basic arrangement as that of the apparatus as shown in FIG. 1. The apparatus of this embodiment, however, has a plurality of agitators 30, instead of the aforementioned stationary vanes 10. The agitator 30 defines the movable-vane-type (active-type) auxiliary device. Explanatory descriptions on the generic arrangement of the apparatus as shown in FIG. 10 are substantially the same as the descriptions on the corresponding arrangement of the apparatus as illustrated in FIG. 1, and therefore, duplicated descriptions are omitted by referring to the aforementioned descriptions on the arrangement of the apparatus as show in FIG. 1.

FIGS. 11 and 12 are a vertical cross-sectional view and a plan view, each showing the structure of the calciner 1 schematically. FIGS. 13 (A) and 13 (B) are a side elevational view and a plan view, each showing the structure of the agitator 30 schematically. FIG. 13 (C) is a front elevational view of agitating vanes. FIG. 14 is a view of the interior area α as seen obliquely from its upper side, wherein the area surrounding the vanes is illustrated in a condition that the raw gypsum M has not been dumped to the calciner 1.

In FIGS. 11 and 12, the structure of the calciner 1 as shown in FIG. 10 is schematically illustrated. As shown in FIG. 11, the body of the calciner 1 is supported through the jaw parts or leg parts 51 by the support frame 52, similarly to the aforementioned embodiment. The tubular passage 53 of the line S extends through the top wall 3 and depends therefrom in the internal area α. The upper surface Ma (the level ha) of the deposit of the raw gypsum M is located below the lower end opening of the passage 53, similarly to the aforementioned embodiment. As illustrated by dotted lines in FIG. 12, four agitators 30 are located, spaced at an approximately equal angular interval from each other. As illustrated in FIG. 11, each of the agitators 30 is positioned at the level hc on the conical wall 6. The level hc is set to be in a range from 0.3×ha to 0.7×ha, preferably, in a range from 0.4×ha to 0.6×ha. Thus, the agitating vanes 31 of the agitator 30 is positioned at a level below the upper surface Ma so as to be fully embedded in the deposit Ms as shown in FIG. 11. The level hc is the height of a point of intersection CP between the wall surface of the conical wall 6 (the conical surface of the structure) and a center axis X-X of the agitator 30 (FIG. 13).

The structure of the agitator 30 is illustrated in FIG. 13. The vanes 31 of the agitator 30 is paddle-type agitating vanes rotating about the center axis X-X of the agitator 30. The agitator 30 has a boss section 32 integrated with the rotary shaft 36 and four vane parts 33 extending radially outward from the boss section 32. The vane parts 33 extend from the boss section 32 in an approximately orthogonal direction, as seen in their front elevational views (FIG. 13 (C)). A plane of each of the vane parts 33 is inclined relative to the axis X-X. An inclination angle θ11 of the plane of each of the vane parts 33 is an angle, preferably, in a range from 10 degrees to 60 degrees, and more preferably, in a range from 30 degrees to 60 degrees (in the present embodiment, approximately 30 degrees).

The agitator 30 is provided with a sheath pipe 35, a supporting section 34, a joint section 61, a base part 60, a bearing section 62 and a holding structure 42. The sheath pipe 35 is concentric with a rotary shaft 36. The supporting section 34 has required airtightness and heat-resistance properties. The joint section 61 integrally connects a proximal end portion of the shaft 36 with a drive shaft 41 of a driving device 40. The bearing section 62 is supported by the base part 60 and the shaft 36 is rotatably journaled by the bearing section 62. The driving device 40 is fixed onto the base part 60 by the holding structure 42. The sheath pipe 35 is a heat-resistant metallic pipe having a cylindrical inside area γ which protects the supporting section 34 from the movement and heat of the solid components and the high temperature gas in the area α.

As shown in FIG. 14, the pipe 35 extends through the conical wall 6. A conical-wall-penetrating part 37 of the pipe 35 is integrally jointed to the wall 6 by fixing means, such as welding. The shaft 36 extends through a center part of the supporting section 34 (FIG. 13) and protrudes to the area α from the area γ in the pipe 35. The vanes 31 are rotated about the center axis X-X in the area α.

FIGS. 15 and 16 are a plan view and a vertical cross-sectional view, each showing a positional relation between the agitator 30 and the conical wall 6. In FIGS. 15 and 16, the interior surface of the wall 6 is shown by a perfect circle or a straight line of a two-dot chain line (a phantom line). In FIG. 15, the center line CL of the calciner 1 (a center of the wall 6 as seen in its plan view) is illustrated. Further, in each of FIGS. 15 and 16, there is shown the point of intersection CP between the interior wall surface of the wall 6 (the inclined wall) and the center axis X-X of the agitator 30. Furthermore, in FIG. 15, there are shown a tangential line GL at the point of intersection CP and a normal line RL (a radially extending line as depicted by a one-dot chain line) at the point of intersection CP. As shown in FIG. 15 (B), the point of intersection CP is positioned at the center of the area γ of the pipe 35.

As shown in FIG. 15(A), the four agitators 30 are positioned around the center line CL of the calciner 1 and are spaced apart from one another at angular intervals of θ15, θ16, θ17, θ18. Each of the angles θ15, θ16, θ17, θ18 is set to be an angle in a range from 60 degrees to 120 degrees. In the present embodiment, the angle θ15 is set to be 110 degrees, the angle θ16 is set to be 90 degrees, and the angles θ17, θ18 are set to be 80 degrees, respectively. The angles θ15, θ16, θ17, θ18 may be set to be an equal angle (e.g., 90 degrees), or the angles θ15, θ16, θ17, θ18 may be set to be arbitrary values respectively.

As shown in FIG. 15(B), a center axis X-X of the agitator 30 extends into the area α in a direction inclined counter-clockwise (in its plan view) at an angle θ12 with respect to the normal line RL as seen in the plan view. The angle θ12 is set to be an angle, preferably, in a range from 30 degrees to 80 degrees, more preferably, in a range from 45 degrees to 75 degrees. As shown in FIG. 16, the axis X-X of the agitator 30 extends on the side of the interior area in a direction inclined at an angle θ13 with respect to a horizontal plane. The angle θ13 is set to be an angle, preferably, in a range from −15 degrees to 40 degrees. An angle θ19 of the axis X-X relative to the inclined surface of the conical wall 6, which is an angle around a horizontal axis passing through the point of intersection CP, is set to be, preferably, in a range from 50 degrees to 105 degrees. In this embodiment, an angle θ14 of the wall 6 inclined relative to the horizontal plane is set to be approximately 65 degrees, and the center axis X-X is oriented in a direction perpendicular to the wall 6 (an angle θ19 is 90 degrees), and the angle θ13 is set to be approximately 25 degrees.

An operation of the calciner 1 having the aforementioned arrangement is explained hereinafter.

In use of the calciner 1 as shown in FIG. 10, the raw gypsum M is fed to the area α through the line S and is accumulated in the lower part of the area α, and the high temperature gas spouting flow Hg of the tubular combustor 2 is ejected from the lower end openings of the tubes 24 to the bottom part of the calciner, similarly to the gypsum calcination system as shown in FIG. 1.

Each of the agitators 30 is operated to transfer a torque of the driving device 40 to the vanes 31 through the shafts 41, 36, whereby the vanes 31 are rotated. A rotational speed of the agitator 30 is set to be in a range from 200 rpm to 400 rpm, e.g., 300 rpm. The raw gypsum M of the deposit Ms is fluidized by the flow Hg, and the raw gypsum M loses its combined water by heat-transfer contact with the flow Hg, whereby the raw gypsum M is calcined to, mainly, gypsum hemihydrate. Similarly to the system as shown in FIG. 1, the flow Hg is introduced into the exhaust gas pipe E and then, exhausted out of the system through the dust separator B and the dust collector.

As described previously, the raw gypsum M moves upward in the center part of the deposit Ms under the pressure of the flow Hg, and then, a lot of the raw gypsum M moves radially outward in an upper layer part of the deposit Ms, and thereafter, the raw gypsum M moves downward along the inner wall surface of the wall 6, whereby the gypsum M is circulated to the bottom part of the calciner. In such a fluidizing process, the raw gypsum M is heated by heat-exchange with the high temperature gas, and is calcined to be the gypsum hemihydrate and so forth by loss of combined water. Then, the calcined gypsum is extracted from the calciner through the outlet port 8 by the overflow device 9, and is fed through the delivery line V to the system carrying out the succeeding process, as being the calcined gypsum W.

The raw gypsum M in the vicinity of the conical wall 6 is energized in the circumferential direction of the wall 6 by the vanes 31, so that the raw gypsum M is moved in the circumferential direction of the calciner or the movement of the raw gypsum M in the circumferential direction thereof is augmented. The raw gypsum M fluidized by the flow Hg or the raw gypsum M suspended in the flow Hg is relatively easily deviated in the circumferential direction by the vanes 31. Therefore, a flow or moving bed of the raw gypsum M or the calcined gypsum W, which is circumferentially fluidized in the vicinity of the inner wall surface, is generated. This flow or moving bed may not be inevitably recognized clearly as an independent flow or moving bed. That is, the agitator 30 is intended to ensure an dynamic action for positively fluidizing the gypsum M, W in the vicinity of the interior wall surface toward the circumferential direction at least partially, or it is intended to provide the deposit Ms with such a positive action.

According to the experiments conducted by the present inventors, in which the gypsum dihydrate has been calcined to the gypsum hemihydrate with use of an actual calciner corresponding to the calciner 1, it has been found that, when the agitator 30 is operated, the ratio of the gypsum dihydrate contained in the calcined gypsum W is generally reduced in comparison with this ratio in a condition that the agitator 30 is not operated, and therefore that, in operation of the agitator 30, the uniformly calcined gypsum can be produced, which has the amount of the combined water generally reduced and which has the little uneven calcination. Further, since the raw gypsum M can be uniformly calcined, a value of set temperature for calcination can be decreased by approximately 6 or 7 degrees C. For example, with respect to the temperature for calcination which is detected by the temperature sensor T, the target or preset value of the temperature for calcination can be decreased from 150 degrees C. down to 143 or 144 degrees C. For instance, in a case where the city gas is used as the fuel of the calciner 1, the fuel consumption is reduced by approximately 5% if the set value of the temperature in the calciner is lowered by 6.5 degrees C. Therefore, employment of the agitator 30 with the aforementioned arrangement is significantly effective in reduction of the fuel consumption of the calciner 1.

In the embodiment as set forth above, the four agitators are located on the wall of the calciner, so as to be circumferentially spaced apart from one another. However, the two or three agitators, or the five or more agitators spaced apart from one another may be located on the wall of the calciner. Further, the center axis of rotation of the agitator is inclined to extend obliquely upward into the calciner in this embodiment, but the center axis of rotation of the agitator may be oriented in a horizontal direction or directed to extend toward a direction inclined obliquely downward.

Furthermore, the vanes in this embodiment are paddle-type agitating vanes which have four vane portions radially extending. However, the number of vanes may be two or three, or five or more, or the agitator may have the other type of agitating vanes, such as propeller-type or turbine-type agitating vanes.

Although the present invention has been described as to preferred embodiments, the present invention is not limited thereto, but may be carried out in any of various modifications or variations without departing from the scope of the invention as defined in the accompanying claims.

For instance, the embodiment as set forth above relates to the gypsum calciner in which the present invention is applied to the multiple-tube-type combustor, but the present invention may be applied to, e.g., a tubular combustor with slits or the like formed at a lower end portion of the combustor.

Further, the embodiment as set forth above relates to a conical-kettle-type gypsum calciner, but the present invention may be applied to another type of gypsum calciner, such as a gypsum calciner in a cylindrical form.

Furthermore, the embodiment as set forth above relates to a gypsum calciner for calcining gypsum dihydrate to gypsum hemihydrate, but the present invention may be applied to a gypsum calciner for calcining gypsum dihydrate to anhydrous gypsum, a gypsum calciner using waste gypsum as the raw gypsum, and so forth.

INDUSTRIAL APPLICABILITY

The present invention can be applied to an apparatus and method for calcination of gypsum. In particular, the present invention is preferably applied to such an apparatus and method, wherein the raw gypsum is calcined or dehydrated for producing the gypsum hemihydrate or the like, which is used as a raw material for production of gypsum based boards. According to the present invention, fluidity of the deposit of the raw gypsum accumulated in the calciner is so improved that uneven calcination can be prevented from occurring in the calcined gypsum and that the fuel consumption of the apparatus can be reduced. Therefore, the practical value of the present invention is remarkable. Further, the arrangement of the present invention can be relatively easily applied to not only a newly constructed calciner but also an existing calciner to be reformed, and therefore, the present invention is practically advantageous.

LIST OF REFERENCE NUMERALS

1 gypsum calciner
2 tubular combustor
3 top wall of calciner
4 wall of calciner
5 cylindrical wall
6 conical wall
7 bottom wall of calciner
8 outlet port for extracting calcined gypsum
9 overflow device
10 stationary vane (auxiliary device)
15 convex curved surface
16 concave curved surface
24 narrow tube
30 agitator (auxiliary device)
31 agitating vane
32 boss section
33 vane part
34 supporting section for rotary shaft
35 sheath pipe
36 rotary shaft
37 conical-wall-penetrating section
40 driving device
60 base part
$\alpha$ interior area of calciner
$\beta$ intratubular area
$\gamma$ inside area η overlapping area
ν radially outward end of overlapping area
H high temperature gas (hot gas at high temperature)
Hg high temperature gas spouting flow
M raw gypsum
Ma upper surface of deposit
Ms deposit of raw gypsum
P fluid path
S raw gypsum supply line
W calcined gypsum
X center axis of rotation of rotary shaft
CL center line
CP point of intersection
RL normal line
θ1-θ6, θ11-θ19 angle

The invention claimed is:

1. An apparatus for calcination of gypsum, comprising:
a gypsum calciner having an interior wall surface with a circular or annular horizontal cross-section or profile, and a tubular combustor configured to generate a high temperature gas, so that a spouting flow of the high temperature gas is ejected to an interior area of the gypsum calciner through a high temperature gas outlet provided at a lower part of the tubular combustor, so that when raw gypsum is fed to the interior area it is continuously or intermittently fluidized and calcined or dehydrated by the high temperature gas, and the calcined or dehydrated gypsum is discharged out of the gypsum calciner; and
an auxiliary device configured to energize the raw gypsum in a vicinity of the interior wall surface toward a circumferential direction of the gypsum calciner, or to augment a movement of the raw gypsum in the vicinity of the interior wall surface toward the circumferential direction,
wherein the tubular combustor is located at a center part of the calciner and is positioned at a level at which the lower part of the tubular combustor is positioned below a level of an upper surface of a deposit of raw gypsum accumulated in the interior area of the calciner and embedded in the deposit;
wherein the auxiliary device has a plurality of stationary vanes circumferentially arranged in an outer peripheral zone of the tubular combustor and spaced at an angular interval from each other, the vanes are positioned at a level at which each of the vanes is at least partially embedded in the deposit and a lower edge portion of each of the vanes is positioned in an area above the high temperature gas outlet; and
wherein the vanes adjacent to each other define a fluid path for the raw gypsum and the high temperature gas, so that an upward flow of the high temperature gas, which is spouted to a bottom part of the gypsum calciner, is deflected toward a radially outward and circumferential direction of the tubular combustor by the fluid path.

2. The apparatus as defined in claim 1, wherein said vanes adjacent to each other define said fluid path which opens toward an inner peripheral zone of the calciner and extends upward in a direction generally inclined relative to a vertical direction.

3. The apparatus as defined in claim 1, wherein, with respect to angular positions of outer and inner ends of a lower part of said vane around a center axis of said combustor, the outer end of the vane backward in a direction of deflection of said flow is located at an angular position forward in the direction of deflection, relative to the inner end of the vane forward in said direction of deflection, or wherein proximal end portions of the adjacent vanes attached to said combustor are superimposed as seen in their plan views, so that an overlapping area (η) of the adjacent vanes is formed in the outer peripheral zone of the lower end portion of said combustor.

4. The apparatus as defined in claim 1, wherein said angular interval is set to be an angle in a range from 10 degrees to 60 degrees.

5. The apparatus as defined in claim 1, wherein said vane is a curved plate defining the curved fluid path, which deflects the raw gypsum upwardly moving together with said upward flow, toward the radially outward and circumferential direction.

6. The apparatus as defined in claim 1, wherein an upper edge portion of said vane is curved as seen in its plan view, and is generally inclined downward, toward a direction radially outward of said combustor.

7. The apparatus as defined in one of claim 1, wherein the lower edge portion of said vane is curved as seen in its plan view, and an outer end portion of the lower edge portion is spaced at a predetermined horizontal distance (dc) from said interior wall surface, and the horizontal distance (dc) is set to be equal to or smaller than 0.1×a diameter (da), wherein the diameter (da) is an inner diameter of said interior wall surface at a level of said outer end portion.

8. A method for calcination of gypsum with use of said apparatus as defined in claim 1,
wherein said high temperature gas in said combustor is cooled by thermal radiation to said internal area through an outside surface of the combustor, and then, spouted toward the bottom part of the calciner from said high temperature gas outlet, and said upward flow of the high temperature gas fluidizes the raw gypsum of the deposit and heats the raw gypsum by heat-transfer contact with the raw gypsum; and
wherein said upward flow of the high temperature gas is guided toward the radially outward and circumferential direction of said combustor by said stationary vanes, so that said raw gypsum is fluidized toward the radially outward and circumferential direction of the combustor with deflection of the upward flow, whereby the raw gypsum in the vicinity of the interior wall surface is energized toward the circumferential direction of the calciner, or the movement of the raw gypsum toward the circumferential direction in the vicinity of the interior wall surface is augmented.

9. An apparatus for calcination of gypsum, comprising:
a gypsum calciner having an interior wall surface with a circular or annular horizontal cross-section or profile, and a tubular combustor located at a center part of the calciner and generating a high temperature gas, wherein a spouting flow of the high temperature gas is ejected to an interior area of the calciner through a high temperature gas outlet provided at a lower part of the combustor, so that raw gypsum fed to the interior area continuously or intermittently is calcined or dehydrated by the high temperature gas, and the calcined or dehydrated gypsum is discharged out of the calciner; and
an auxiliary device energizing the raw gypsum in a vicinity of the interior wall surface toward a circumferential direction of said calciner, or augmenting a movement of the raw gypsum in the vicinity of the interior wall surface toward the circumferential direction, wherein the auxiliary device has an agitator which extends through a conical surface or an inner circumferential surface defined by said interior wall surface;

wherein the agitator is provided with a rotary shaft protruding into the calciner from said conical or inner circumferential surface in a position below an upper surface of the raw gypsum accumulated in the calciner, and an agitating vane rotating in the interior area with rotation of the rotary shaft; and wherein a center axis (X) of the rotation of said shaft is oriented in a direction at an angle (θ12) in a range from 30 degrees to 80 degrees as seen in its plan view, relative to a normal line (RL) passing through a point of intersection (CP) between said axis (X) and said conical or inner circumferential surface, and said vane rotates about said axis (X) to energize the raw gypsum in the vicinity of the interior wall surface toward a circumferential direction of the interior wall surface.

10. The apparatus as defined in claim 9, wherein said angle (θ12) of the center axis (X) is set to be an angle in a range from 45 degrees to 75 degrees.

11. The apparatus as defined in claim 9, wherein an inclined angle (θ13) of said center axis (X) relative to a horizontal plane passing through said point of intersection (CP) is set to be an angle in a range from −15 degrees to 40 degrees.

12. The apparatus as defined in claim 9, wherein said vane is of paddle-type agitating vanes which include a plurality of vanes extending radially outward from a rotation center area containing said rotary shaft, and a plane of each of the vanes is inclined at an angle (θ11) relative to said center axis (X), the angle (θ11) being in a range from 10 degrees to 60 degrees.

13. The apparatus as defined in claim 9, wherein said agitator has a sheath pipe which surrounds said rotary shaft in concentricity with the shaft, and a supporting section for the shaft, which is located inside of the sheath pipe; wherein said sheath pipe is fixed to a body of said calciner; and wherein said rotary shaft is rotatably journaled by said supporting section, and the shaft extends into the calciner from an open end of the sheath pipe on its interior side and carries said vane in the interior area.

14. The apparatus as defined in claim 9, wherein a height hc of said point of intersection (CP) relative to a bottom surface of the calciner is set to be a value in a range from 0.3×ha to 0.7×ha, wherein "ha" is a height of an upper surface (Ma) of a deposit of said raw gypsum measured from said bottom surface.

15. The apparatus as defined in one of claim 9, wherein the at least three agitators are positioned to be circumferentially spaced apart at an angular interval from each other.

16. A method for calcination of gypsum with use of the apparatus as defined in claim 9, wherein the raw gypsum in the vicinity of the interior wall surface is energized toward the circumferential direction of said calciner by rotation of said vane, or a movement of the raw gypsum toward the circumferential direction in the vicinity of the interior wall surface is augmented by the rotation of said vane.

17. The method as defined in claim 16, wherein a value of set temperature for calcination in a condition that the agitator is in operation is decreased by at least 5 degrees C., in comparison with the value of set temperature for calcination in a condition that the agitator is not in operation.

18. A method for calcination of gypsum, with use of a calciner having an interior wall surface with a circular or annular configuration as seen in its plan view and a tubular combustor located at a center part of the calciner, comprising:

fluidizing and calcining or dehydrating raw gypsum by a spouting flow of a high temperature gas ejected from a lower part of the tubular combustor, positioning the tubular combustor at a level at which the lower part of the tubular combustor is positioned below a level of an upper surface of a deposit of raw gypsum accumulated in an interior area of the calciner to embed the lower part of the combustor in the deposit, arranging a plurality of stationary vanes in an outer peripheral zone of the tubular combustor and spaced at an angular interval from each other, and partially embedding each of the vanes in the deposit of raw gypsum so that a lower edge of each of the vanes is located in an area above the high temperature gas outlet; and guiding an upward flow of the high temperature gas spouting to a bottom part of the calciner toward a radially outward and circumferential direction of the tubular combustor by the vanes, and fluidizing the raw gypsum toward the radially outward and circumferential direction of the tubular combustor by the upward flow, whereby the raw gypsum in a vicinity of the interior wall surface is energized toward the circumferential direction of the calciner, or a movement of the raw gypsum toward the circumferential direction in the vicinity of the interior wall surface is augmented.

19. The method as defined in claim 18, wherein, with respect to angular positions of outer and inner ends of a lower part of the vane around a center axis of said combustor, the outer end of the vane backward in a direction of deflection of said flow is located in an angular position forward in the direction of deflection, relative to the inner end of the vane forward in the direction of deflection, whereby a movement of the flow directed in the radially outward direction is restricted from occurring, so as not to impede the movement of said raw gypsum in the circumferential direction, or a proximal end portion of the vane is located to be superimposed over the proximal end portion of the adjacent vane as seen in their plan views, so that the vanes adjacent to each other form an overlapping area (η) of the vanes in an outer peripheral zone of a lower end portion of said combustor, whereby said upward flow is prevented from blowing vertically upward in a zone close to an outer peripheral surface of the combustor.

\* \* \* \* \*

UNITED STATES PATENT AND TRADEMARK OFFICE
CERTIFICATE OF CORRECTION

PATENT NO. : 10,350,564 B2
APPLICATION NO. : 15/553073
DATED : July 16, 2019
INVENTOR(S) : Katsumi Niimi et al.

Page 1 of 1

It is certified that error appears in the above-identified patent and that said Letters Patent is hereby corrected as shown below:

In the Claims

Column 22, Line 20:
In Claim 7, after "in" delete "one of".

Signed and Sealed this
Third Day of September, 2019

Andrei Iancu
*Director of the United States Patent and Trademark Office*